United States Patent
Hikosaka et al.

(10) Patent No.: US 8,728,616 B2
(45) Date of Patent: May 20, 2014

(54) POLYMER SHEET AND METHOD FOR PRODUCING SAME

(75) Inventors: Masamichi Hikosaka, Higashi-Hiroshima (JP); Kiyoka Okada, Higashi-Hiroshima (JP); Kaori Watanabe, Higashi-Hiroshima (JP); Junichiro Washiyama, Kawasaki (JP); Hideharu Kimura, Kawasaki (JP); Koji Yamada, Kawasaki (JP); Takeshi Nakajima, Kawasaki (JP); Akihiro Otsubo, Kawasaki (JP)

(73) Assignees: Hiroshima University, Hiroshima (JP); Sunallomer Ltd., Tokyo (JP)

( * ) Notice: Subject to any disclaimer, the term of this patent is extended or adjusted under 35 U.S.C. 154(b) by 0 days.

(21) Appl. No.: 13/138,212

(22) PCT Filed: Jan. 21, 2010

(86) PCT No.: PCT/JP2010/000317
§ 371 (c)(1),
(2), (4) Date: Aug. 10, 2011

(87) PCT Pub. No.: WO2010/084750
PCT Pub. Date: Jul. 29, 2010

(65) Prior Publication Data
US 2011/0300364 A1 Dec. 8, 2011

(30) Foreign Application Priority Data
Jan. 23, 2009 (JP) ................. 2009-013260

(51) Int. Cl.
*C08F 110/00* (2006.01)
*C08F 110/06* (2006.01)
*C08F 6/26* (2006.01)

(52) U.S. Cl.
USPC ........ 428/220; 428/500; 525/240; 526/348.1; 977/788

(58) Field of Classification Search
USPC ............... 428/220, 500; 525/240; 526/348.1; 977/788
See application file for complete search history.

(56) References Cited

U.S. PATENT DOCUMENTS

| 4,234,530 A | 11/1980 | Thiel et al. |
| 4,254,079 A | 3/1981 | Agrawal |

(Continued)

FOREIGN PATENT DOCUMENTS

| EP | 0 135 628 A2 | 4/1985 |
| EP | 1938948 A1 | 7/2008 |

(Continued)

OTHER PUBLICATIONS

EP 2168997 A1, published Mar. 31, 2010, used for translation and citation for WO 2009008340.*

(Continued)

*Primary Examiner* — Maria Veronica Ewald
*Assistant Examiner* — Joanna Pleszczynska
(74) *Attorney, Agent, or Firm* — Harness, Dickey & Pierce, P.L.C.

(57) ABSTRACT

A polymer sheet according to at least one embodiment of the present invention is a polymer sheet whose main component is oriented nanocrystals of a polymer, and which satisfies the following conditions (I), (II), and (III): (I) having a crystallinity of not less than 70%; (II) having a tensile strength at break of not less than 100 MPa and a tensile modulus of not less than 3 GPa; and (III) having an average thickness of not less than 0.15 mm. According to at least one embodiment of the present invention, it is possible to provide a polymer sheet excelling in properties such as mechanical strength, heat tolerance, and transparency, particularly a polymer sheet having excellent properties such as mechanical strength, heat tolerance, and transparency in general-purpose plastics such as polypropylene.

11 Claims, 14 Drawing Sheets

(56) References Cited

U.S. PATENT DOCUMENTS

| | | | |
|---|---|---|---|
| 4,380,526 | A | 4/1983 | Agrawal |
| 5,286,540 | A | 2/1994 | Suga et al. |
| 5,505,900 | A | 4/1996 | Suwanda et al. |
| 5,945,215 | A | 8/1999 | Bersted et al. |
| 6,190,760 | B1 | 2/2001 | Nagai et al. |
| 6,203,902 | B1 | 3/2001 | Ota et al. |
| 6,734,270 | B1 | 5/2004 | Minami et al. |
| 7,871,548 | B2 | 1/2011 | Hikosaka et al. |
| 2001/0053443 | A1 | 12/2001 | Perez et al. |
| 2004/0242103 | A1 | 12/2004 | Loos et al. |
| 2005/0182233 | A1 | 8/2005 | Weinhold et al. |
| 2008/0063846 | A1 | 3/2008 | Loos et al. |
| 2009/0249883 | A1 | 10/2009 | Hikosaka et al. |
| 2010/0063235 | A1 | 3/2010 | Hikosaka et al. |
| 2011/0014408 | A1 | 1/2011 | Fujiwara et al. |

FOREIGN PATENT DOCUMENTS

| | | | |
|---|---|---|---|
| JP | 55-84635 | A | 6/1980 |
| JP | 58185224 | A | 10/1983 |
| JP | 6089333 | A | 5/1985 |
| JP | 6097835 | A | 5/1985 |
| JP | 6097836 | A | 5/1985 |
| JP | 61-193836 | A | 8/1986 |
| JP | 6345029 | A | 2/1988 |
| JP | 0592470 | | 4/1993 |
| JP | 07-053734 | A | 2/1995 |
| JP | 07-243120 | A | 9/1995 |
| JP | 09-316283 | A | 12/1997 |
| JP | 2000-218750 | A | 8/2000 |
| JP | 2003-041074 | A | 2/2003 |
| JP | 2004-181782 | A | 7/2004 |
| JP | 2005-238755 | A | 9/2005 |
| JP | 4041885 | A | 2/2008 |
| JP | 4041885 | B | 2/2008 |
| KR | 100148775 | B1 | 8/1998 |
| TW | 431968 | | 5/2001 |
| WO | WO 03/008190 | A1 | 1/2003 |
| WO | WO-2007026832 | A1 | 3/2007 |
| WO | WO-2008108251 | A1 | 9/2008 |
| WO | WO-2009008340 | A1 | 1/2009 |

OTHER PUBLICATIONS

Japanese Office Action mailed Jun. 18, 2013, issued in Japanese Application No. 2009-502539, with English translation.
Andrew J. Lovinger, et al., "*Studies on the α and β Forms of Isotactic Polypropylene by Crystallization in a Temperature Gradient*," Journal of Polymer Science: Polymer Physics Edition, vol. 15, pp. 641-656 (1977).
U.S. Office Action mailed Aug. 29, 2013 in U.S. Appl. No. 12/449,848.
U.S. Office Action dated Jul. 11, 2012 issued in U.S. Appl. No. 12/449,848.
A. Keller, M.J. Machin, J. Macromol.Sci, Phys., B1(1), 501 (1967) p. 41-91.
S. Yamazaki, M. Hikosaka et al., Polymer, 46, 2005, 1675-1684.
S. Yamazaki, M. Hikosaka et al., Polymer, 46, 2005, 1685-1692.
K. Watanabe et al, Macromolecules 39(4), 2006, 1515-1524.
B. Wunderlich, T., Arakawa, J., Polym. Sci., 2, 3697-3706 (1964).
Fujiyama, M., "Structure of skin . . . ", Kobunshi Ronbunshu, vol. 32, No. 7, pp. 411-417 (Jul. 1975).
M. Hikosaka, Polymer 1987 28 1257-1264.
Watanabe, K.: "Development of high . . . ", Collection of Summaries of Lectures in the 52nd Chautauqua of Polymers, The Society of Polymer Science, Japan, Jul. 26, 2006, A-8, p. 40-42.
International Search Report, 2010.
Buerger, et al., "Crystallization of sheared polymer melts: poly(ethylene oxide) fractions," *Polymer Bulletin*, vol. 22, Nos. 5-6, pp. 593-598 (1989).
European Search Report dated Dec. 14, 2010 issued for corresponding European Application No. EP 08712063.0.
Göschel, et al., "Crystallization in isotactic polypropylene melts during contraction flow: time-resolved synchrotron WAXD studies"; Polymer, vol. 41, Issue 4, Feb. 2000, pp. 1541-1550.
Hillig. "A deviation of classical two-dimensional nucleation kinetics and the associated crystal growth laws." Acta Metallurgica, 14, 1966, 1868-1869.
International Preliminary Report on Patentability published Nov. 25, 2010 in International Application No. PCT/JP2010/000317 (with English translation).
Kumaraswamy, et al., "Shear-Enhanced Crystallization in Isotactic Polypropylene. 1. Correspondence between in Situ Rheo-Optics and ex Situ Structure Determination," *Macromolecules*, vol. 32, pp. 7537-7547 (1999).
Korean Notice of Allowance dated Apr. 20, 2011 for corresponding Korean Application No. 10-2009-7019387 (with English translation).
Somani, et al., "Shear-Induced Molecular Orientation and Crystallization in Isotactic Polypropylene: Effects of the Deformation Rate and Strain," *Macromolecules*, vol. 38, pp. 1244-1255 (2005).
Taiwanese Office Action dated Apr. 2, 2012 for corresponding Taiwanese Application No. 097107180 (with English translation).
U.S. Office Action dated Jun. 24, 2010 in corresponding U.S. Appl. No. 12/065,197.
U.S. Office Action dated Dec. 21, 2009 in corresponding U.S. Appl. No. 12/065,197.
Watanabe, et al., "Mechanism of Acceleration of Growth Rate Under Shear Flow," *Polymer Preprints*, Vo. 54, No. 1 (2005) (full translation).
U.S. Office Action dated Feb. 3, 2012 for corresponding U.S. Appl. No. 12/449,848.

\* cited by examiner

POLYMER SHEET AND METHOD FOR PRODUCING SAME

TECHNICAL FIELD

The present invention relates to a polymer sheet whose main component is polymer nanocrystals, which polymer sheet has excellent properties in properties such as mechanical strength, heat tolerance, and transparency. Moreover, the present invention relates to a method of producing such a polymer sheet.

BACKGROUND ART

The so-called "general-purpose plastics" such as polyethylene (hereinafter, referred to as "PE"), polypropylene (hereinafter, referred to as "PP"), polystyrene (hereinafter, referred to as "PS"), and polyvinyl chloride (hereinafter, referred to as "PVC"), are commonly used as materials for various daily-use products (such as bags, various wrappings, various containers, and sheets) and materials for industrial parts of automobiles and electrical products, daily necessities, miscellaneous goods, and the like, not only because they are available at very low prices of 100 yen or less per kilogram, but also because they are easy to mold and are lighter in weight than that of metal and ceramics (are a fraction of the weight of metal or ceramics).

However, the general-purpose plastics have drawbacks such as that the general-purpose plastics are insufficient in mechanical strength and that they have low heat tolerance. Accordingly, the general-purpose plastics currently are limited in its applicable range, since the general-purpose plastics do not fulfill the sufficient properties required as materials used for various industrial products, e.g. mechanical products such as automobiles, and electrical, electronic, and information products. For example, PE typically softens at a temperature of approximately 90° C. Further, PP, which is considered to have a relatively high heat tolerance, typically softens at approximately 130° C. Moreover, since PP is insufficient in transparency in comparison with polycarbonate (hereinafter, referred to as "PC"), polyethylene terephthalate (hereinafter, referred to as "PET") and PS, PP suffers from such a drawback that it cannot be used as optical materials, bottles, or transparent containers.

On the other hand, the so-called "engineering plastics" such as PET, PC, fluoroplastics (e.g. Teflon (registered trademark)), nylon, polymethylpentane, polyoxymethylene, and acrylic resin, have excellent mechanical strength, heat tolerance, transparency, and like properties, and typically do not soften at 150° C. Therefore, the engineering plastics are used as various materials for industrial products such as automobiles, mechanical products and electric products which require high performance, and optical materials. However, the engineering plastics suffer from serious drawbacks: For example, the engineering plastics are expensive, and the engineering plastics are very environmentally unfriendly because it is difficult or impossible to convert them back into monomers for recycling.

Therefore, if the material properties such as mechanical strength, heat tolerance, and transparency of the general-purpose plastics are so remarkably improved that the general-purpose plastics can replace the engineering plastics and even metal materials, it becomes possible to greatly reduce costs of various industrial products and daily-use products made of polymers and metals, greatly save energy through a reduction in weight, and improve its operability. For example, if PP can be used instead of PET which is currently used as bottles for beverages such as soft drinks, this allows for greatly reducing the costs of bottles. Although it is possible to recycle PET into monomers, it is not easy to carry this out. Hence, used PET bottles are cut, are reused once or twice in low-quality applications such as using as clothing fibers and films, and thereafter are discarded. Meanwhile, PP can be easily recycled into monomers; this allows a complete recycling of PP, thus bringing about a merit that it is possible to reduce the consumption of fossil fuels such as oil and reduce generation of carbon dioxide ($CO_2$).

As mentioned above, in order to improve the properties such as the mechanical strength, heat tolerance, and transparency of the general-purpose plastics to use the general-purpose plastics as a replacement of the engineering plastics and metals, a remarkable increase is necessary in the proportion of crystals (crystallinity) in PP or PE, or more preferably, a crystal substance which is purely crystalline and which hardly contains an amorphous PP or PE is necessarily prepared. Particularly, high expectations are placed on PP, since PP is advantageous in that it has a stronger mechanical strength and a higher heat tolerance as compared to PE. Further, PP is an important polymer which maintains a high yearly production increase rate of several percent.

One method known to improve crystal properties of a polymer is to cool melt of the polymer at a slow rate. This method, however, is totally insufficient in the increase of crystallinity. Further, this method causes a significant deterioration in productivity of products, and further causes an increase in crystal grain size to a bulky size, thus causing a decrease in mechanical strength. Another method proposed to increase the crystallinity is to cool the melt of the polymer under high pressure. This method, however, requires applying a pressure of several hundred atm or greater to the melt of the polymer. Although this method is possible theoretically, it is not feasible in industrial production due to the complicated design required of the production apparatus and due to its high production cost. Thus, this method is difficult to accomplish practically. Another method known to improve the crystal properties of the polymer is to add a nucleating agent to the polymer melt. However, this method currently suffers from the following drawbacks: (a) inevitable contamination of the nucleating agent as impurities, and (b) an insufficient increase in crystallinity, and an increase in cost due to the nucleating agent being much higher in cost than that of the resin. In conclusion, there is currently no complete method to dramatically improve the crystallinity of a polymer such as the general-purpose plastics, and to produce a crystal substance of the polymer.

Incidentally, many studies have shown that the polymer melt (isotropic melt) in which molecular chains take random conformation (e.g. "random coil") is crystallized under shear flow to sparsely generate a combination of shish crystal form and kebab crystal form in the polymer melt (see Non patent Literature 1). The shish crystal form is a fiber-like crystal of several $\mu m$ in diameter and is oriented along the flow. The kebab crystal form is a lamination of thin-film crystal and amorphous skewered through the shish crystal form. This form is referred to as "shish-kebab", meaning "skewer" and "meat" of skewered grilled-chicken (Japanese "Yakitori").

In the production of the shish-kebab form, only the shish form is created locally in an initial period. The shish form is of an Extended Chain Crystal (ECC) structure in which straightly-elongated molecular chains are crystallized (see Non patent Literature 5). On the other hand, the crystal portion of the kebab form is of a Folded Chain Crystal (FCC) structure in which the molecular chains are folded at a surface of the thin-film crystal. How the shish-kebab form is produced has not been explained in terms of molecular theory, since no studies have been carried out kinetically, and thus was unknown. The FCC is a thin-film crystal (called a lamellar crystal) which is most widely seen among polymer crystals. Moreover, it is commonly known that injection molding forms a "skin" (which is a thin crystalline film of several hundred μm thickness) on surface, and a "core" inside. The core is an aggregate of "laminated structures (laminated lamellar structures)" in which the folded chain crystal and amorphous are laminated (see Non patent Literature 6). It is considered that the skin is formed from the shish-kebab form, but the shish has been observed as being formed only sparsely. No studies have been performed based on kinetic study on the production mechanism of the skin structure, and hence the production mechanism remains totally unknown.

The inventors of the present invention are pioneers to study the production mechanism of the shish form kinetically, and found the mechanism of the local formation of the shish form in the melt: at a boundary with heterogeneity, some molecular chains in the melt attain liquid crystal orientation because the molecular chains are elongated due to "topological interaction" with the boundary, and the melt becomes "Oriented melt" (e.g., see Non patent Literatures 2 and 3). Here, the "topological interaction" is an effect of "string-like polymer chains pulling each other because the polymer chains are entangled". The topological interaction is well known as an interaction unique of the polymer. The inventors of the present invention are first to report a theory of the topological crystallization mechanism of polymers, explaining how the ECC and FCC are formed. This theory is called "sliding diffusion theory" and is recognized worldwide (see Non patent Literature 7).

Moreover, the inventors of the present invention reports, through an elucidation of a generation mechanism of "spiralite" found in a shear flow crystallization at a low shear strain rate of 0.01 to 0.1 $s^{-1}$, a general mechanism that in shear crystallization, a shear strain rate of polymer melt remarkably increases at an interface of solid and liquid phases, which causes an increase in an elongate strain rate, and by this increase, the molecular chains are elongated to locally form the oriented melt, thereby remarkably speeding up nucleation and growth speed (see Non patent Literature 4).

Based on these, it is expected that the polymer crystallization will be facilitated and high crystallinity can be achieved if the entire polymer melt becomes the oriented melt by applying a large elongation strain rate which exceeds the "critical" elongation strain rate (called critical elongation strain rate) of the polymer melt. The polymer melt which has entirely become the oriented melt is referred to as "bulk oriented melt". Further it is expected that if the bulk oriented melt can be crystallized with the orientation, a crystal structure in which a majority of the molecular chains of the polymer are oriented can be produced (the crystal structure is referred to as bulk "polymer oriented crystals"). In this case, the nucleation is significantly facilitated and a vast number of nuclei are generated between molecular chains without adding a nucleating agent thereto. This eliminates the need of the addition of the impurity and allows a crystal size to be in nanometer order. It is expected that this leads to obtaining polymers with high transparency and with a dramatically improved mechanical strength and heat tolerance.

The inventors of the present invention carried out continuous studies to provide a method of producing polymer crystals having excellent properties in properties such as mechanical strength, heat tolerance, and transparency, and to provide polymer crystals produced by such a production method. As a result, they found that polymer crystals having the excellent properties are achievable by elongating melt of a polymer (also called "polymer melt") at an elongation strain rate not slower than a critical elongation strain rate, to make the polymer melt into an oriented melt, and thereafter cooling the oriented melt in that state for crystallization (for example, see Patent Literatures 1 and 2).

CITATION LIST

Patent Literatures

Patent Literature 1
International Publication No. 2007/026832 brochure (International Publication Date: Mar. 8, 2007)
Patent Literature 2
International Publication No. 2008/108251 brochure (International Publication Date: Sep. 12, 2008)

Non Patent Literatures

Non Patent Literature 1
A. Keller, M. J. Machin, J. Macromol. Sci., Phys., B2, p. 501 (1968)
Non Patent Literature 2
S. Yamazaki, M. Hikosaka et al., Polymer, 46, 2005, pp. 1675-1684.
Non Patent Literature 3
S. Yamazaki, M. Hikosaka et al., Polymer, 46, 2005, pp. 1685-1692.
Non Patent Literature 4
K. Watanabe et al., Macromolecules 39(4), 2006, pp. 1515-1524.
Non Patent Literature 5
B. Wunderlich, T. Arakawa, J. Polym. Sci., 2, pp. 3697-3706 (1964)
Non Patent Literature 6
M. Fujiyama, "*Structure of Skin Layer of Extruded Polypropylene*", Polymer Preprints, 32(7), pp. 411-417 (1975)
Non Patent Literature 7
M. Hikosaka, Polymer, 1987, 28, pp. 1257-1264

SUMMARY OF INVENTION

Technical Problem

The inventions disclosed in Patent Literatures 1 and 2 uniquely found by the inventors of the present invention allowed for producing a thin film of polymer crystals having a thickness of approximately 0.1 mm. However, the polymer crystal film is insufficient in a case where the polymer crystals are used as the industrial material, and polymer crystals formed as a sheet (referred to as "polymer sheet") having a thickness of 0.15 mm or more is at times required. Meanwhile, the technique disclosed in Patent Literatures 1 and 2 are not capable of producing such a polymer sheet on an industrial production scale.

Accordingly, an object of the present invention is to develop a technique for producing a polymer sheet on an industrial production scale, and for providing a polymer sheet having excellent properties in properties such as mechanical strength, heat tolerance, and transparency that could not be yielded conventionally.

Solution to Problem

As a result of carrying out diligent study for attaining the object, the inventors of the present invention were successful in developing a method of determining a condition that allows production of polymer sheets on an industrial production scale, and were successful in developing a production apparatus (forming apparatus). The present invention was accomplished as such. Namely, the present invention was accomplished by an accomplishment of the method of determining conditions and the production apparatus. However, the present invention is not limited to a polymer sheet that is produced by the foregoing method and production apparatus.

A polymer sheet according to the present invention is a polymer sheet whose main component is nanocrystals of a polymer, the polymer sheet satisfying the following conditions (I), (II), and (III):

(I) having a crystallinity of not less than 70%;

(II) having a tensile strength at break of not less than 100 MPa and a tensile modulus of not less than 3 GPa; and (III) having an average thickness of not less than 0.15 mm.

The polymer may be polyolefin, or the polymer may be polypropylene.

The polymer sheet according to the present invention preferably has a heat distortion temperature measured in accordance with a test-piece size direct-reading method, of not less than 160° C.

The polymer sheet according to the present invention preferably has a haze value (thickness of 0.3 mm) of the polymer sheet measured in accordance with a haze measuring method, of not more than 10%.

The polymer sheet according to the present invention preferably includes a cylindrical high order structure having a diameter of not more than 300 nm, the cylindrical high order structure being made up of oriented nanocrystals arranged in a parallel manner.

The polymer sheet according to the present invention preferably includes, in its crystal structure, oriented nanocrystals having a $\alpha_2$ fraction of not less than 0.3, the $\alpha_2$ fraction being indicative of a volume fraction of a $\alpha_2$ phase which is a high order degree phase.

The polymer sheet according to the present invention preferably includes oriented nanocrystals having an orientation function $f_c$ of not less than 0.7, the orientation function $f_c$ being indicative of a degree of orientation of a polymer chain inside a crystal.

The polymer sheet according to the present invention is a polymer sheet preferably produced by (i) sandwiching polymer melt of a supercooled state between a pair of sandwiching rollers, (ii) elongating the polymer melt by rolling at an elongation strain rate not slower than a critical elongation strain rate, and (iii) crystallizing the polymer melt. The polymer melt in the supercooled state may be extruded out from a slit die or may be a plate-shaped supercooled melt produced in a hot bath.

Moreover, the polymer sheet according to the present invention may be produced by setting a radius R of the sandwiching rollers, an average thickness L of the polymer sheet which has been subjected to the elongation by rolling, and a sheet take-off speed V at the sandwiching rollers by use of the following approximation formula (Formula i), so that an average elongation strain rate $\epsilon$(R, L, V) in a sheet thickness direction is not less than a critical elongation strain rate $\epsilon$*(R, L, V):

(Formula i)

$$\varepsilon(R, L, V) = \frac{V}{\sqrt{RL}} \qquad \text{Math. 1}$$

where R is the radius of the sandwiching rollers, L is the average thickness of the polymer sheet which has been subjected to the elongation by rolling, V is the sheet take-off speed at the sandwiching rollers, and $\epsilon$(R, L, V) is the average elongation strain rate in the sheet thickness direction.

The critical elongation strain rate $\epsilon$*(R, L, V) may be determined by any kind of method, and can be determined for example by a method disclosed in Patent Literature 1 or 2.

Moreover, in producing the polymer sheet according to the present invention, the critical elongation strain rate $\epsilon$*(R, L, V) is calculated by the following approximate formula (Formula ii):

(Formula ii)

$$\varepsilon^*(R, L, V) = \frac{V^*}{\sqrt{RL}} \qquad \text{Math. 2}$$

Here, V* is a sheet take-off speed at a critical point, which sheet take-off speed V* at a critical point is the sheet take-off speed V at a critical point at a time when a structure changes completely at once upon crystallization into a polymer sheet having the thickness L and being made up of oriented nanocrystals, by feeding polymer melt of a supercooled state, sandwiching the polymer melt between the pair of sandwiching rollers each having the radius R, and elongating the polymer melt by rolling at the sheet take-off speed V.

Moreover, in producing the polymer sheet according to the present invention, the critical elongation strain rate $\epsilon$*(R, L, V) is calculated by the following approximate formula (Formula iii):

(Formula iii)

$$\varepsilon^*(R, L, V) = \frac{V}{\sqrt{RL^*}} \qquad \text{Math. 3}$$

Here, L* is a thickness of the polymer sheet at a critical point, which thickness L* of the polymer sheet at a critical point is the thickness L of the polymer sheet at a critical point at a time when a structure changes completely at once upon crystallization into a polymer sheet having the thickness L and to being made up of oriented nanocrystals, by feeding polymer melt of a supercooled state, sandwiching the polymer melt between the pair of sandwiching rollers each having the radius R, and elongating the polymer melt by rolling at the sheet take-off speed V.

Determination of whether or not the structure has changed completely at once is not particularly limited, and this can be determined by for example observing with an optical microscope. More specifically, this can be determined by a method described in Examples later described.

Moreover, the present invention includes in its scope a multilayered solid including at least one layer of the polymer sheet according to the present invention.

A method according to the present invention of manufacturing a polymer sheet includes: sandwiching polymer melt of a supercooled state between a pair of sandwiching rollers; elongating the polymer melt by rolling at an elongation strain rate not less than a critical elongation strain rate; and crystallizing the elongated polymer melt, the polymer sheet being produced by setting a radius R of the sandwiching rollers, an average thickness L of the polymer sheet which has been subjected to the elongation by rolling, and a sheet take-off speed V at the sandwiching rollers by use of the following approximation formula (Formula i), so that an average elongation strain rate ε(R, L, V) in a sheet thickness direction is not less than a critical elongation strain rate ε*(R, L, V):

(Formula i)

$$\varepsilon(R, L, V) = \frac{V}{\sqrt{RL}} \qquad \text{Math. 4}$$

where R is the radius of the sandwiching rollers, L is the average thickness of the polymer sheet which has been subjected to the elongation by rolling, V is the sheet take-off speed at the sandwiching rollers, and ε(R, L, V) is the average elongation strain rate in the sheet thickness direction.

Moreover, in producing the polymer sheet according to the present invention, the critical elongation strain rate ε*(R, L, V) is calculated by the following approximate formula (Formula ii):

(Formula ii)

$$\varepsilon^*(R, L, V) = \frac{V^*}{\sqrt{RL}} \qquad \text{Math. 5}$$

Here, V* is a sheet take-off speed at a critical point, which sheet take-off speed V* at a critical point is the sheet take-off speed V at a critical point at a time when a structure changes completely at once upon crystallization into a polymer sheet having the thickness L and being made up of oriented nanocrystals, by feeding polymer melt of a supercooled state, sandwiching the polymer melt between the pair of sandwiching rollers each having the radius R, and elongating the polymer melt by rolling at the sheet take-off speed V.

Moreover, in producing the polymer sheet according to the present invention, the critical elongation strain rate ε*(R, L, V) is calculated by the following approximate formula (Formula iii):

(Formula iii)

$$\varepsilon^*(R, L, V) = \frac{V}{\sqrt{RL^*}} \qquad \text{Math. 6}$$

Here, L* is a thickness of the polymer sheet at a critical point, which thickness L* of the polymer sheet at a critical point is the thickness L of the polymer sheet at a critical point at a time when a structure changes completely at once upon crystallization into a polymer sheet having the thickness L and being made up of oriented nanocrystals, by feeding polymer melt of a supercooled state, sandwiching the polymer melt between the pair of sandwiching rollers each having the radius R, and elongating the polymer melt by rolling at the sheet take-off speed V.

In theory, it was possible to produce the polymer sheet of the present invention in consideration of the techniques developed and opened to the public by the inventors of the present invention (for example, Patent Literatures 1 and 2). However, absolutely no apparatus for actually producing the polymer sheet or method for determining conditions in producing the polymer sheet were known. Consequently, it was impossible to practically produce the polymer sheet of the present invention easily, even by a person skilled in the art. Meanwhile, the inventors of the present invention found an apparatus that can practically produce the polymer sheet, and found a method for determining the conditions in producing the polymer sheet. The polymer sheet according to the present invention was accomplished as such. Furthermore, since the polymer sheet according to the present invention is a polymer sheet having extremely excellent properties of properties such as mechanical strength, heat tolerance, and transparency, the polymer sheet of the present invention yields a remarkable and advantageous effect to the conventional technique. Hence, the polymer sheet according to the present invention sufficiently has novelty and inventive step.

The polymer sheet according to the above-mentioned present invention is excellent in properties such as mechanical strength, heat tolerance (e.g. breaking strength, rigidity, and toughness), and transparency. It is of great significance to be able to use general-purpose plastics in replacement of metal and the like by providing excellent properties in properties such as high mechanical strength to the general-purpose plastics, since general-purpose plastics including polypropylene is inexpensive. Further, since polypropylene can be completely recycled into monomers, it can be a very environmentally friendly material.

Advantageous Effects of Invention

As described above, according to the present invention, it is possible to provide a polymer sheet which has excellent properties in properties such as mechanical strength, heat tolerance, and transparency. As a result, general-purpose plastics can be used in replacement of engineering plastics, thereby leading to a remarkable reduction in costs of various industrial products made of polymers. Moreover, the present invention allows for giving the polymers strength equivalent to that of metals. Thus, the present invention yields an effect of allowing use of bulk polymer crystals in replacement of metals. The use of the bulk polymer crystals in replacement of metals, for interior and exterior material of a conveyance apparatus for example, reduces the weight of the conveyance apparatus to a fraction since the specific gravity of the bulk polymer crystals is one eighth of the metal. This reduces fuel consumption, thereby making a great contribution to energy saving.

DESCRIPTION OF EMBODIMENTS

Figure 1:
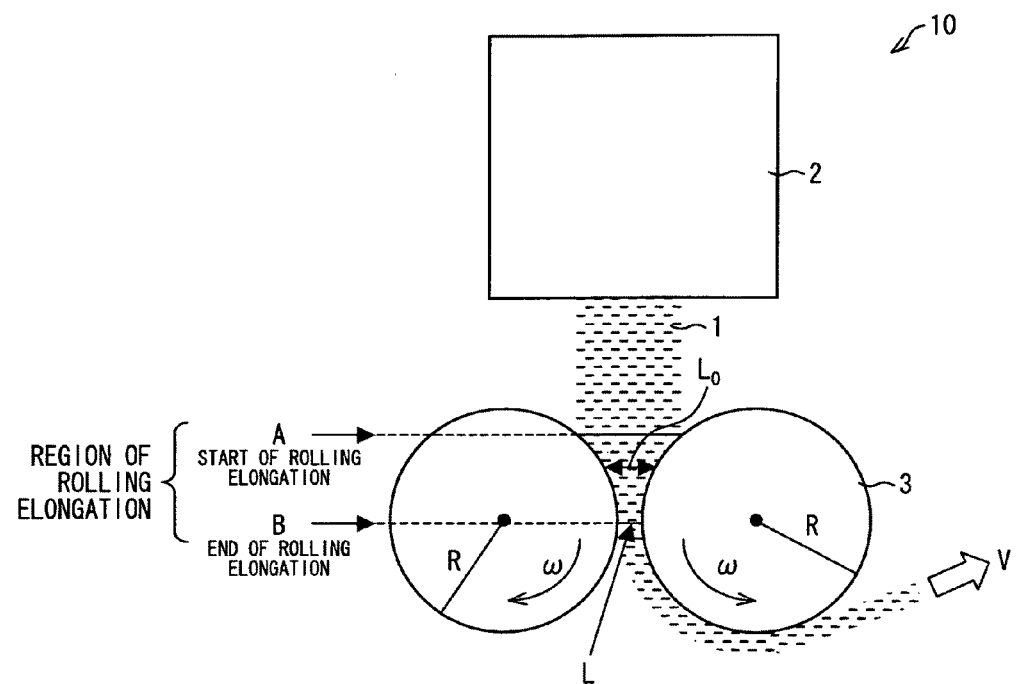
FIG. 1 is a schematic view illustrating an apparatus (continuously formable apparatus 10) for producing a polymer sheet of the present invention.

One embodiment of the present invention is as described below. It should be noted that the present invention is not limited to this embodiment and can be modified in various ways within the scope thereof recited below.

<1. Polymer Sheet According to the Present Invention>

A polymer sheet according to the present invention is a polymer sheet whose main component is nanocrystals of a polymer, the polymer sheet satisfying the following conditions (I), (II), and (III):

(I) having a crystallinity of not less than 70%;

(II) having a tensile strength at break of not less than 100 MPa and a tensile modulus of not less than 3 GPa; and (III) having an average thickness of not less than 0.15 mm.

The polymer is not particularly limited, and may be so-called general-purpose plastics such as polyethylene (PE), polypropylene (PP), and polystyrene (PS), or may be the so-called engineering plastics such as polyethylene terephthalate (PET), nylon, or fluoroplastic such as Teflon (registered trademark). If the inexpensive general-purpose plastics can be used in replacement of the engineering plastics by improving properties such as mechanical property, heat tolerance, and transparency, it is possible to remarkably reduce costs of industrial parts and the like made of resin. Hence, it is preferable to apply the general-purpose plastics to the production method of present invention. Furthermore, PP is preferable among the general-purpose plastics, because PP is higher in heat tolerance and mechanical strength as compared to other general-purpose plastics. Moreover, among PP, isotactic polypropylene (hereinafter, referred to as "iPP" where appropriate) is particularly preferable. This is because iPP has good crystallinity due to its structure in which methyl groups are oriented in one direction, thereby allowing for easy obtainment of oriented polymer crystals. Moreover, the oriented polymer crystals prepared from iPP can attain finer crystal molecules more easily than that prepared from normal PP. As a result, it is possible to obtain oriented polymer crystals having a higher transparency.

The polymer sheet according to the present invention may be any polymer sheet as long as the polymer sheet is mainly composed of polymer nanocrystals, and not just crystal but also amorphous may be included in the polymer sheet. The "polymer nanocrystals" denote a crystal structure in which a size of a crystal is of nanometer order (that is, less than 1 μm, preferably not more than 300 nm, further preferably not more than 100 nm, further preferably not more than 50 nm, further preferably not more than 30 nm, and further preferably not more than 20 nm). Particularly, nanocrystals of a polymer in which a polymer chain is strongly oriented to an extending direction is called "oriented polymer nanocrystals". The expression of "whose main component is nanocrystals" denotes that the nanocrystals is contained in the polymer sheet by a proportion of at least 70%, preferably not less than 80%, further preferably not less than 90%, most preferably not less than 95%.

Further, in particular, the polymer sheet of the present invention is preferably, but is not limited to, an aspect that contains particularly no impurities such as a nucleating agent (i.e. "nucleating-agent-free polymer crystal"). Since homogenous nucleation occurs in the polymer sheet according to the present invention, the polymer sheet according to the present invention is of a polymer crystal structure having an excellent mechanical strength even without containing a nucleating agent. The absence of a nucleating agent allows avoiding a cost increase caused by using a nucleating agent much more expensive than polymer resin. The term "nucleating agent" in the embodiment means a substance that serves as a nucleus for crystal formation, and is a collective term for substances that are added to increase crystallinity.

Further, the polymer sheet of the present invention may be composed of a single polymer or a mixture of a plurality of types of polymers. For example, it is possible to combine PP, PE, first-class polybutene and the like as appropriate. A combination of the plurality of types of polymers allows for compensating a drawback in one type of polymer with another polymer. The blend ratio of the polymers may be set as appropriate in accordance with its purpose.

The polymer sheet according to the present invention has a crystallinity of not less than 70%, preferably not less than 80%, and further preferably not less than 90%. The "crystallinity of a polymer sheet" in the embodiment denotes a proportion of crystals contained in the polymer sheet. The crystallinity of the polymer sheet can be examined by a publicly known method. For example, the crystallinity can be determined by a density method using mass M and volume V (see L. E. Alexander, "X-ray diffraction of polymers (vol. one)", Kagaku-Dojin, 1973, p. 171). A crystallinity $X_c$ of the polymer crystals is calculated by the following formula:

$$X_c = \frac{\rho_c}{\rho}\left(\frac{\rho-\rho_a}{\rho_c-\rho_a}\right) \quad \text{Math. 7}$$

In the foregoing formula, $\rho$ represents a density of a sample, $\rho_a$ represents an amorphous density, and $\rho_c$ represents a crystal density. Note that values written in literature can be used as $\rho_a$ and $\rho_c$ (see Qirk R. P. and Alsamarriaie M. A. A., A wiley-interscience publication, New York, Polymer Handbook, 1989). For example, according to the Polymer Handbook, the crystal density and the amorphous density of iPP are $\rho_a$=0.855 (g/cm$^3$) and $\rho_c$=0.936 (g/cm$^3$), respectively. Meanwhile, the density $\rho$ of the sample is obtained by the following formula:

(Formula) $\rho = M \div V$ (g/cm$^3$).

Moreover, the polymer sheet of the present invention has an average thickness of not less than 0.15 mm, preferably not less than 0.2 mm, further preferably not less than 0.3 mm, and further preferably not less than 0.4 mm. The "thickness" in the embodiment denotes a distance from one surface of the polymer sheet to the other surface of the polymer sheet measured under a constant static load. The "average thickness" means an average value of a maximum thickness of the polymer sheet and a minimum thickness of the polymer sheet. The thickness of the polymer sheet is measured by use of a micrometer or by use of a scale calibrated using an optical substance microscope (SZX10-3141 manufactured by Olympus Corporation) and an objective micrometer.

On the other hand, the polymer sheet of the present invention is not particularly limited in its length in a longitudinal direction (direction parallel to a traveling direction of the sheet in a case where the polymer sheet is manufactured by use of a roll forming apparatus: also called MD (Machine Direction), length direction) and can be said as being infinite as long as the sheet is basically formed as a roll continuously. Moreover, the polymer sheet of the present invention is not particularly limited in length in a width direction of the sheet (direction perpendicular to the MD: also called TD (Transverse Direction), width direction), and may be set up as any length in accordance with the scale of the forming apparatus of the polymer sheet.

Further, in an aspect of the polymer sheet according to the present invention, the crystal contained in the polymer sheet has a size d of not more than 300 nm, preferably not more than 100 nm, further preferably not more than 50 nm, further preferably 30 nm or less, and further preferably 20 nm or less. The size d of the crystal can be measured by, for example, the publicly known small-angle X-ray scattering method (SAXS method) or the wide-angle X-ray scattering method (WAXS method).

The X-ray scattering method can be performed, for example, by the small-angle X-ray scattering method (SAXS method) or the wide-angle X-ray scattering method (WAXS method). Examples of experimental facilities to which the X-ray scattering method can be applied include SPring-8, Beam Line BL40B2 run by Japan Synchrotron Radiation Research Institute (JASRI), and Photon Factory (PF), Beam Line BL10C run by High Energy Accelerator Research Organization (KEK). Further, a wavelength ($\lambda$) of an X-ray for use in detection is, for example, $\lambda$=0.072 nm or $\lambda$=0.15 nm. As a detector, an Imaging Plate, a position-sensitive detector (PSPC), or the like can be used.

Further, since, in the SAXS method, a primary peak of a curve of the small-axis X-ray scattering intensity ($I_x$) against the scattering vector (q) corresponds to a shortest distance between microcrystals (=crystal size d) in cases where microcrystals of an average size d are randomly packed (see A. Guinier, "*Ekkusu-sen Kessyogaku no Riron to Jissai*" (Theory and Practice of X-ray Crystallography), Rigaku Corporation, p. 513, 1967), the crystal size d is calculated by the Bragg equation:

$d = 2\pi q.$

Further, in an aspect of the polymer sheet according to the present invention, in a case where the polymer sheet is made of polypropylene, the crystal contained in the polymer sheet has a number density $\nu$ of not less than 40 $\mu m^{-3}$, preferably not less than $10^3$ $\mu m^{-3}$, more preferably not less than $10^4$ $\mu m^{-3}$, and particularly preferably not less than $10^5$ $\mu m^{-3}$. The number density $\nu$ can be calculated by the following equation:

(Formula) Number density $\nu(\mu m^{-3})$=crystal size $d^{-3}$

According to Hall-Petch's law (see *Nano Materiaru Kogaku Taikei* (Handbook for Nanomaterials), Vol. 2, Nano Kinzoku (Nanometals), Fujitec Corporation, 2005, p. 20), it is known that the strength of a crystal increases in proportion to an inverse of a square root of the crystal size d. Therefore, it can be easily understood that the strength of the polymer sheet according to the present invention is remarkably improved. For example, in a case where the crystal size d changes from 1 $\mu m$ to 10 nm, the strength increases tenfold ($\sqrt{100}$=10).

One aspect of the polymer sheet according to the present invention is that a diameter $\phi$ of a cylindrical high order structure included in the polymer sheet is not more than 300 nm, preferably not more than 200 nm, and further preferably not more than 100 nm. The diameter $\phi$ of the structure may be measured, for example, by the publicly known small-angle X-ray scattering method (SAXS method).

The curve of the small-angle X-ray diffuse scattering intensity ($I_x$) against the scattering vector ($q^2$), of the SAXS method, provides a form factor due to its own scattering, for each cylindrical high order structure (see A. Guinier, "*Ekkusu-sen Kessyogaku no Riron to Jissai*" (Theory and Practice of X-ray Crystallography), Rigaku Corporation, p. 555-556, 1967), and the diameter $\phi$ is calculated from a radius of inertia $R_g$ by applying an approximated curve by Guinier plot.

Formula of Guinier plot: $I_x = A\exp(-R_g^2 q^2/3)$, where, in the embodiment, $-R_g^2 q^2/3$ is smaller than 1

(Formula)

$$\phi = 2\sqrt{\frac{5}{3}} R_g \qquad \text{Math. 8}$$

Note that A in the formula of the Guinier plot is a constant value.

The polymer sheet according to the present invention has a polymer chain strongly oriented in the extending direction. Moreover, oriented nanocrystals whose diameter of the crystal grains is around 20 nm (called "primary structure") is oriented in the extending direction while the oriented nanocrystals are connected to each other three-dimensionally with use of a polymer chain (called "secondary structure"). These connected oriented nanocrystals are made as a bundle per several to several tens thereof, and forms a sufficiently long and narrow cylindrical high order structure having a diameter $\phi$ and a length of several µm or more (called "tertiary structure"). Thereafter, cylindrical high order structures are gathered up to finally form a sheet. As such, by connecting a precise hierarchical structure of the primary structure, the secondary structure, and the tertiary structure without being disconnected, excellent properties are expressed such as excellent mechanical strength, heat tolerance, and transparency, as predicted in Hall-Petch's law.

Figure 14:
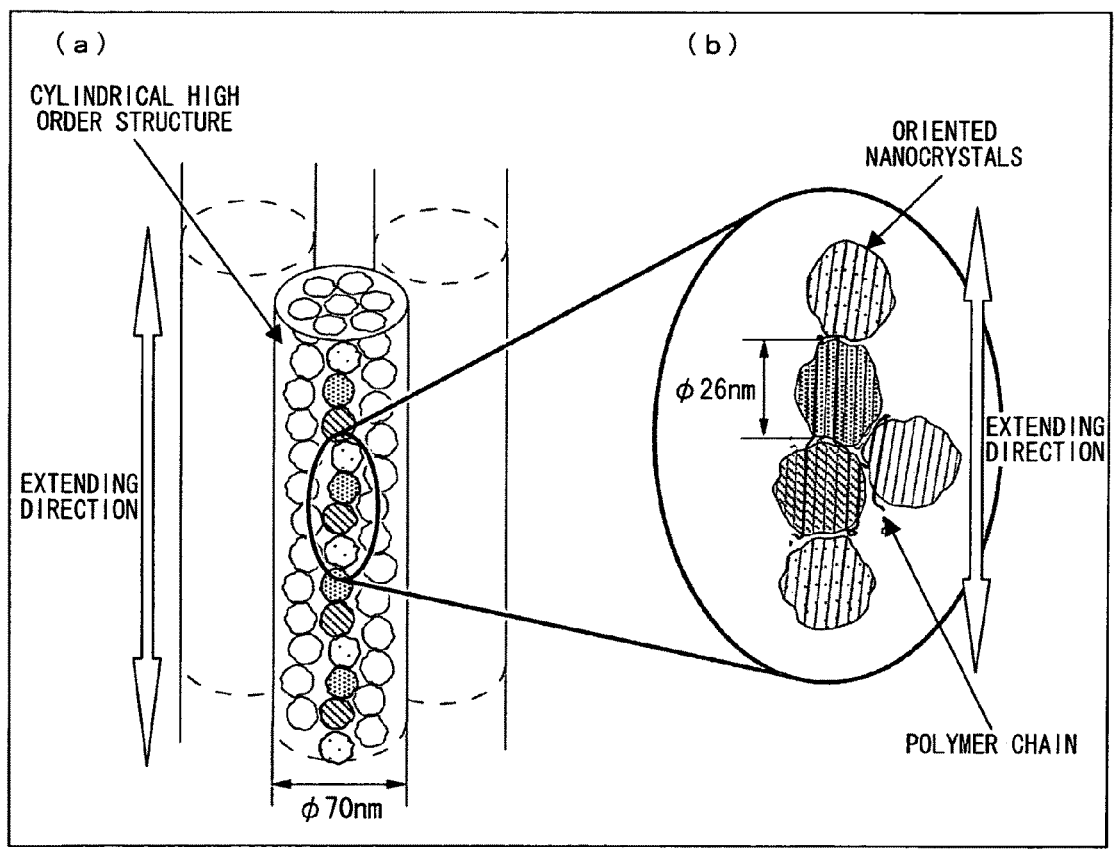
FIG. 14 is a schematic view illustrating a cylindrical higher order structure included in a polymer sheet according to the present invention.

A schematic view of the cylindrical high order structure is illustrated in FIG. 14, to specifically describe the cylindrical high order structure. FIG. 14(a) illustrates one embodiment of the polymer sheet according to the present invention in which cylindrical high order structures having a diameter of approximately 70 nm are arranged. The broken lines in FIG. 14(a) each show a cut end. The cylindrical high order structures have different heights. The nanocrystals run in rows like irregular rosaries in the cylindrical high order structure, and a bundle of approximately several tens of the rosaries are included in the cylindrical high order structure. FIG. 14(b) is an exploded view inside the cylindrical high order structure. According to FIG. 14(b), the oriented nanocrystals and the polymer chains are oriented in the extending direction. Moreover, one polymer chain penetrates through a plurality of oriented nanocrystals while reciprocating.

As one aspect of the polymer sheet according to the present invention, in a case where the polymer sheet is polypropylene, a volume fraction of an $\alpha_2$ phase in the crystal structure of the oriented nanocrystals contained in the polymer sheet represented by $\alpha_2$ fraction is at least 0.3, preferably not less than 0.5, and further preferably not less than 0.7. The rate of $\alpha_2$ fraction of the foregoing structure may be measured, for example, by the publicly known wide-angle X-ray scattering method (the WAXS method).

Measurement of the $\alpha_2$ fraction by the WAXS method may be measured by using an X-ray scattering intensity analysis software (R-axis display; manufactured by Rigaku Corporation), in a case where the Imaging Plate is used as a detector for example. For details of how the $\alpha_2$ fraction is calculated, refer to the description in Examples later described.

In the embodiment, the $\alpha_2$ phase is a phase having a high degree of order, and $\alpha_1$ phase is a phase having a low degree of order in which its structure is confused (see M. Hikosaka, Polymer Journal, 1973, 5, p. 111-127). The $\alpha_2$ phase has properties such as mechanical strength and heat tolerance more excellent than those of the $\alpha_1$ phase, and it is important to have the high $\alpha_2$ fraction in order to achieve a high performance material.

One aspect of the polymer sheet according to the present invention is that, in the case where the polymer sheet is polypropylene, an orientation function $f_c$ representing a degree of orientation of the polymer chain within the crystal contained in the polymer sheet is not less than 0.7, is preferably not less than 0.8, and is further preferably not less than 0.9. The orientation function $f_c$ can be measured by, for example, the publicly known wide-angle X-ray scattering method (WAXS method).

Measurement of the orientation function $f_c$ by the WAXS method, in a case where the Imaging Plate is used as a detector, may be measured by using an X-ray scattering intensity analysis software (R-axis display; manufactured by Rigaku Corporation). For details of how to calculate the orientation function $f_c$, refer to the description in Examples described later.

In a case of a crystalline polymer, the larger the orientation function $f_c$ is, the more the mechanical strength in the MD direction increases. Hence, the orientation function is important in obtaining high performance material.

The polymer sheet according to the present invention has a tensile strength at break of not less than 100 MPa and preferably not less than 0.21 GPa, which tensile strength at break is measured by a method in conformity with a tensile test method of JIS K7127, and has a tensile modulus of not less than 3 GPa and preferably not less than 4 GPa. As a tensile tester for measurement, a precision universal tester manufactured by Shimadzu Corporation (autograph AG-1 kNIS) is used, and a test piece having a size of a gauge length of 7 mm to 10 mm, a width of a narrow parallel part of 1.5 mm to 3.0 mm, and a thickness of 0.2 mm 0.4 mm is used. For details of the tensile test, refer to the description in Examples later described.

A tensile modulus (Young's modulus, modulus of direct elasticity) is a constant which determines a value of strain with respect to stress within a range of elasticity.

[Strain $\epsilon$]=[Stress $\sigma$]/[tensile modulus $E$](Hooke's law)

The tensile modulus is calculated in conformity with a method disclosed in JIS K7161. Namely, the tensile modulus can be calculated from an amount of strain with respect to one-way stretching or the direction of compression stress, and corresponds to the slope of a linear portion of a stress-strain curve according to the Hooke's law, whose vertical axis represents stress and whose horizontal axis represents strain. For details of how to calculate the tensile Modulus, refer to the description in Examples later described. Measurement of the tensile strength at break and the tensile modulus are measured at room temperature of 25° C.

In the polymer sheet according to the present invention, a haze value (thickness of 0.3 mm) of a test piece having a thickness of 0.3 mm, which haze value is measured by a haze measuring method devised by the inventors of the present invention, is a value not more than 10% (preferably not more than 5%, further preferably not more than 1%). In the description of the embodiment, "a haze value (thickness of 0.3 mm)" denotes "a haze obtained by (i) measuring an optical density using a test piece having a thickness of 0.3 mm, and (ii) converting this value by use of a 'calibration curve of haze against optical concentration'". The haze measuring method is carried out by measuring the amount of transmission light which transmits through the test piece. The haze measuring method may be employed by an apparatus including an optical microscope (BX51N-33 P-OC; manufactured by Olympus Corporation) which uses a halogen lamp or the like as a light source of white light, a CCD camera (cooled digital camera QICAM; manufactured by QImaging), and an image-analysis software (Image-Pro PLUS; manufactured by Media Cybernetics, Inc.) capable of measuring optical density. The white light, which is the beam used for the measurement, is to enter the test piece as a round shape having a diameter of 1 mm. The optical density can be converted into the haze by use of the "calibration curve of haze against optical density". The "calibration curve of haze against optical density" can be prepared by plotting a haze with respect to an optical density, with use of hazes of 20 positions in a polypropylene sheet measured according to JIS K7105 and the optical density of the polypropylene sheet measured by the haze measuring method.

In the case where the polymer sheet according to the present invention is polypropylene, the polymer sheet has a heat distortion temperature of not less than 160° C., preferably not less than 170° C., and further preferably not less than 175° C., which heat distortion temperature is measured by a test-piece size direct-reading method (method for directly reading the size of a test piece) with use of an optical microscope. The test-piece size direct-reading method is a method uniquely devised by the inventors of the present invention, and the heat distortion temperature can be measured as described in the following description. An apparatus used for measurement is an optical microscope with a CCD camera (BX51N-33P-OC; manufactured by Olympus Corporation), a hot stage (L-600A; manufactured by Linkam Scientific Instruments Ltd.), and an image-analysis software (Image-Pro PLUS; manufactured by Media Cybernetics, Ltd.) that can measure a size displayed on a screen. The measurement uses a test piece having a length of 0.7 mm, a width of 0.7 mm, and a thickness of 0.2 mm to 0.4 mm. The test piece is heated by a temperature increase rate of 1 K per minute, and a temperature at which the test piece started to shrink or expand by 3% or more in a length direction (MD) or a width direction (TD) serves as the heat distortion temperature.

Polypropylene is subjected to phase transition to a $\alpha2'$ phase upon application of heat at a temperature of approximately 159° C. (see F. Gu et al, Polymer 43, 2002, 1473-1481). The $\alpha2'$ phase is a stable crystal phase at a high temperature, and at a temperature not less than 159° C., an a axis and a b axis of the crystal linearly expands by about 2%, as compared with room temperature. Therefore, the heat distortion temperature is defined as a temperature at a time when the crystal contracts or expands by not less than 3% exceeding the range of a thermal expansion of a crystalline lattice, on the basis of the size measured at room temperature. For details of the test-piece size direct-reading method, refer to the description of Example later described.

<2. Method of Producing Polymer Sheet According to the Present Invention>

The following description explains, as an example of a method for producing a polymer sheet of the present invention, a method for producing an oriented polymer sheet uniquely devised by the inventors of the present invention. It should be noted however that the present invention is not limited to this method.

Figure 2:
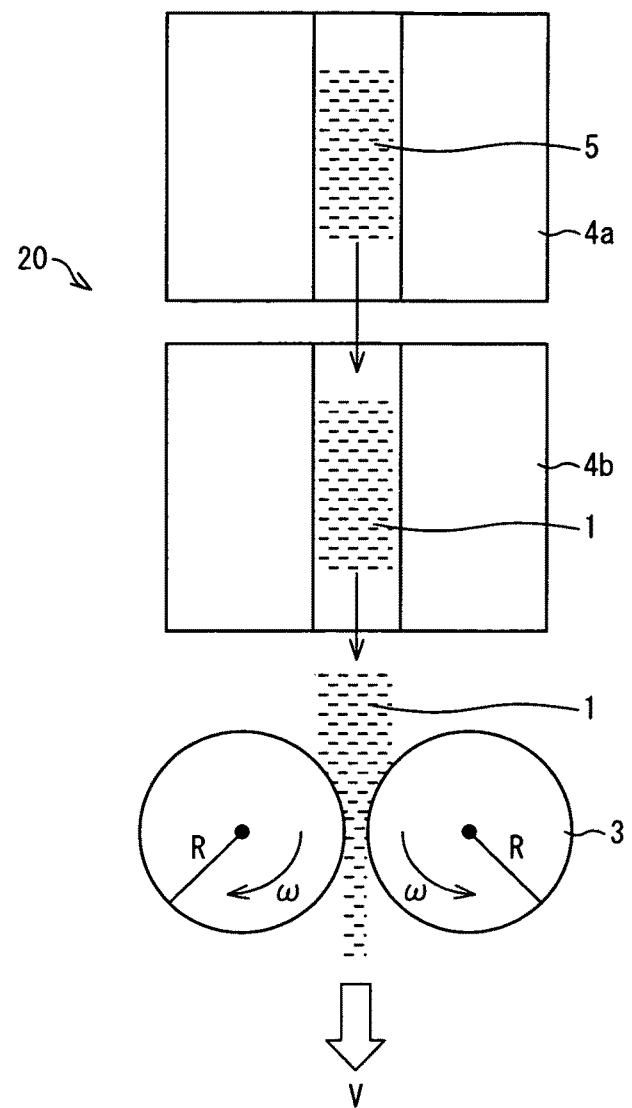
FIG. 2 is a schematic diagram illustrating an apparatus (batch forming apparatus 20) for producing a polymer sheet of the present invention.

The polymer sheet can be produced as follows, for example. FIGS. 1 and 2 illustrate apparatuses (continuously formable apparatus 10, batch forming apparatus 20) for producing the polymer sheet of the present invention. The continuously formable apparatus 10 includes a supercooled melt feeder 2 (an extruding apparatus having a slit die which allows feeding the supercooled melt 1 as a sheet form, or a cooling adapter or a hot bath having a slit die attached to an extruding apparatus), and a pair of sandwiching rolls 3. The supercooled melt feeder 2 for example has a slit die whose tip is shaped as a square, and polymer melt in a supercooling state (called "supercooled melt") is extruded out from the supercooled melt feeder 2.

Moreover in the supercooled melt feeder 2, for example the cooling adapter is a cylindrical object which can be cooled, and the polymer melt is cooled to the supercooling state by having the polymer melt be extruded from the slit die to pass through the inside of the cooling adapter.

The supercooled melt feeder 2 may be a hot bath 4a and a hot bath 4b, each of which having a temperature-controllable heater, as illustrated in the batch forming apparatus 20 of FIG. 2. The supercooled melt 1 is prepared by having a plate-shaped polymer melt 5 prepared in the hot bath 4a which is controlled in temperature to be not less than a melting point, to travel to the hot bath 4b which is set as a supercooling temperature no higher than the melting point.

The sandwiching rollers 3 are provided in the continuously formable apparatus 10 (or batch forming apparatus 20) in such a manner that a pair of rotatable rolls face each other. The sandwiching rollers 3 sandwich the supercooled melt 1 fed from the supercooled melt feeder 2 and elongates the supercooled melt 1 in a rotating direction of the roll, which forms the supercooled melt 1 into a sheet shape.

In a case of producing the polymer sheet of the present invention, the supercooled melt 1 is fed from the supercooled melt feeder 2, is sandwiched between the pair of sandwiching rollers 3, is elongated by rolling at an elongation strain rate not less than a critical elongation strain rate, and is crystallized in this state. This allows for the polymer melt to become an oriented melt, and allows for crystallization of the polymer melt as the oriented melt state. As a result, nucleation (called homogenous nucleation) and growth occurs without the help of a foreign substance, by having the polymer chains contained in the oriented melt meet each other. This as a result allows for the production of a sheet of the polymer crystal.

The temperature at which the polymer melt is in the supercooling state is not particularly limited as long as the temperature is lower than an equilibrium melting point of the polymer. On the assumption that the "supercooling degree $\Delta T$" is defined as the difference between the equilibrium melting point and the crystallization temperature, a particularly optimum supercooling degree remarkably differs depending on the type and characterization of the polymer. Thus, an optimal condition may be employed as appropriate in accordance with the polymer. For example, in the case of polypropylene, $\Delta T$ is preferably in a range of 25° C. to 65° C.

The "crystallization temperature" means a temperature not higher than the melting point which causes the polymer melt to crystallize. A particularly optimum crystallization temperature remarkably differs depending on the type and characterization of the polymer. Thus, an optimum condition may be employed as appropriate in accordance with the polymer. For example, in the case of polypropylene, the temperature is preferably in a range of 120° C. to 160° C. According to the continuously formable apparatus 10 (or the batch forming apparatus 20), the polymer melt is an oriented melt. This allows for polymer chains to meet in parallel, thereby remarkably accelerating the nucleation and growth. As a result, it is possible to crystallize the melt at a relatively high crystallization temperature and in a remarkably short time. The method of cooling the melt to the crystallization temperature may be performed in a gaseous phase, a liquid phase, or with use of a cooling pipe or the like. Moreover, the crystallization temperature can be constant or inconstant. Note that the cooling can be carried out as appropriate by methods and means regularly carried out in polymer production, or further modified methods of these.

The inventors of the present invention devised a formula for determining a design of the continuously formable apparatus 10 (or batch forming apparatus 20) and an operation condition based on a unique idea, and found out that a desirable polymer sheet can be produced by designing and operating the formable apparatus 10 (or batch forming apparatus 20) on the basis of this formula. It was conventionally known that if a polymer melt was elongated at a rate not less than a critical elongation strain rate to obtain an oriented melt and if this oriented polymer melt is crystallized in the oriented state, it is possible to obtain a polymer crystal having a high crystallinity of 70% (e.g. see Patent Literatures 1 and 2). However, no design concept of a production apparatus or conditions for production were known for producing a polymer sheet by roll forming so that the polymer sheet has a thickness of not less than 0.15 mm, as like the present invention. Hence, it was impossible to produce the polymer sheet of the present invention practically by roll forming. The inventors of the present invention fabricated the polymer sheet of the present invention for the first time, upon uniquely devising a design concept of the foregoing production apparatus and a formula (the later-described formula (15), Formula i) for determining conditions of production. Note that the later-described formula (15) (Formula i) is an approximate expression, and the formula for determining the design concept and production conditions of the production apparatus is not limited to the later-described formula (15) (Formula i).

The following further describes the present invention with use of the continuously formable apparatus 10 illustrated in FIG. 1. The following description is also applied to the batch forming apparatus 20 illustrated in FIG. 2. In FIG. 1, focus is given on a region (hereinafter, referred to as "region AB") from a start of rolling elongation (A) to an end of the rolling elongation (B) by use of the sandwiching rollers 3. R is a radius of the sandwiching rollers 3 in the continuously formable apparatus 10, ω is an angular velocity of the sandwiching rollers 3, θ is an angle at which the sandwiching rollers 3 rotate, $L_0$ is a thickness of the polymer supercooled melt at any location in the range AB, L is a thickness of the polymer sheet at point B, which is a point following the end of the rolling elongation, V is a sheet take-off speed, and ε is the elongation strain rate. The roller rotation angle θ in the range AB is very acute.

$$\theta \ll 1 (\text{rad}) \quad (1)$$

The radius R of the rollers is extremely larger than the sheet thicknesses $L_0$ and L.

$$R \ll L_0 \text{ and } L \quad (2)$$

A minute volume φ at any position in the range AB is considered by taking a center of the minute volume as an origin. A direction (MD direction) in which the supercooled polymer melt and the polymer sheet travel serves as an x-axis, a width direction (TD direction) of the supercooled polymer melt sheet serves as a y-axis, and a thickness direction of the supercooled polymer melt sheet serves as a z-axis. The minute volume φ is approximated to a rectangular parallelepiped, and the length of sides of the rectangular parallelepiped are to be x, y, and $L_0$, respectively.

In sheet formation, it can be considered that the width of the supercooled polymer melt sheet, i.e. y, is sufficiently longer than x and $L_0$, and does not change in length by the rolling elongation.

$$y = \text{const} \ll x, L_0 \quad (3)$$

Therefore, in the rolling elongation process with use of the sandwiching rollers, the supercooled polymer melt sheet is compressed in the z-axis direction, and is elongated in the x-axis direction. Namely, the rolling elongation with use of the sandwiching rollers is related to just the x-axis and the z-axis.

Here, if an elongation strain rate tensor in the x-axis direction is $\epsilon_{xx}$ and an elongation strain rate tensor in the z-axis direction is $\epsilon_{zz}$, a relationship between the two is defined as follows:

$$\epsilon_{xx} = -\epsilon_{zz} \quad (5)$$

In derivation of the formula (5), the following law of conservation of mass related to minute volume φ in rolling elongation was used:

$$\phi \approx xyL_0 = \text{const} \quad (4)$$

The strain rate $\epsilon_{zz}$ in the z-axis direction of the range AB in FIG. 1 is defined by the following definitional equation:

$$\epsilon_{zz} \equiv (1/L_0) \times (dL_0/dt) \quad (6)$$

Note that t represents time.

Here, $$L_0 = 2R(1 - \cos\theta) + L \quad (7),$$

so accordingly the following formula (8) is approximately obtained based on the formulae (6), (7), and (1):

$$\epsilon_{zz} \approx -2\omega\sqrt{(R/L) \times (1 - L/L_0)} \quad (8).$$

The elongation strain rate to be calculated is obtained from the formulae (5) and (8):

$$\epsilon_{xx} \approx 2\omega\sqrt{(R/L) \times (1 - L/L_0)} \quad (9).$$

The $\epsilon_{xx}$ is a function of $L_0$ from the formula (9).

A maximum value of the $\epsilon_{xx}$ is $$L_0 = 2L \quad (10).$$

This means that the $\epsilon_{xx}$ reaches its maximum value at $L_0 = 2L$, and that a maximum elongation strain rate is applied on the supercooled melt.

Having the maximum value of the elongation strain rate be represented as $\epsilon_{max}$, substitution of the formula (10) into the formula (9) obtains the following formula:

$$\epsilon_{max} \approx \omega\sqrt{(R/L)} \quad (11).$$

In order to form the sheet at a supercritical elongation strain rate, a condition that $\epsilon_{max}$ is more than the critical elongation strain rate $\epsilon^*$ is required.

Therefore, the formula (11) is defined as the elongation strain rate ε, thereby achieving the following formula:

Math. 9

$$\varepsilon(R, L, \omega) = \omega\sqrt{\frac{R}{L}} \quad (12)$$

$$V = R\omega \quad (13)$$

$$\omega[R, V] = V/R \quad (14)$$

From the formulae (12) and (14),

Math. 10

$$\varepsilon(R, L, V) = \frac{V}{R}\sqrt{\frac{R}{L}} = \frac{V}{\sqrt{RL}} \quad (15)$$

Hence, a desired polymer sheet of the present invention is produced by setting the radius R of the sandwiching rollers, the average thickness L of the elongated polymer sheet, and the sheet take-off speed V of the sandwiching rollers so that the elongation strain rate $\varepsilon(R, L, V)$ becomes not less than the critical elongation strain rate, with use of the formula (15) (also called "Formula i").

The critical elongation strain rate $\varepsilon^*(R, L, V)$ may be any rate determined by any method. For example, a rate determined by a method disclosed in Patent Literature 1 or 2 is applicable to the Formula i.

In the production of the polymer sheet according to the present invention, the critical elongation strain rate $\varepsilon^*(R, L, V)$ may be calculated by the following approximate expression (Formula ii):

(Formula ii)

$$\varepsilon^*(R, L, V) = \frac{V^*}{\sqrt{RL}} \quad \text{Math. 11}$$

Here, V* denotes a sheet take-off speed at a critical point, which sheet take-off speed V* at a critical point is a sheet take-off speed V at a critical point at which a structure changes completely upon crystallization of the polymer melt to a polymer sheet having the thickness L and being made of oriented nanocrystals, by feeding the polymer melt in the supercooled state so as to be sandwiched between the pair of sandwiching rollers having the radius of R, and elongating the polymer melt by rolling at the sheet take-off speed V.

In the production of the polymer sheet according to the present invention, the critical elongation strain rate $\varepsilon^*(R, L, V)$ may be calculated by use of the following approximate expression (Formula iii):

(Formula iii)

$$\varepsilon^*(R, L, V) = \frac{V}{\sqrt{RL^*}} \quad \text{Math. 12}$$

Here, L* is a thickness of the polymer sheet at a critical point, which thickness L* of the polymer sheet at a critical point is a thickness L of the polymer sheet at a critical point at which a structure changes completely at once upon crystallization of the polymer melt to a polymer sheet having the thickness L and being made of oriented nanocrystals, by feeding the polymer melt in the supercooled state so as to be sandwiched between the pair of sandwiching rollers having the radius of R, and elongating the polymer melt by rolling at the sheet take-off speed V.

How determination is made of whether or not the structure has changed completely at once is not particularly limited, and the determination may be carried out by for example observing with an optical microscope. More specifically, it is possible to determine by a method described in Examples later described.

<3. Use of Polymer Sheet According to the Present Invention>

Examples of how the polymer sheet according to the present invention is used are as described below. The polymer sheet of PP is applicable to a large portion (not less than 90%) of interior parts of automobiles. With utilization of its high strength and high toughness, the polymer sheet of PP is applicable to interior and exterior parts of vehicles such as automobiles, airplanes, rockets, trains, vessels, motorbikes, and bicycles, and to machine tool parts and machine members, in replacement of metal. Moreover, with utilization of its high rigidity and its light weight, the oriented polymer sheet is applicable to a speaker or a diaphragm for microphones. With utilization of its high transparency, the polymer sheet is also applicable to CDs or DVDs in replacement of PC. Moreover, with its high transparency, the polymer sheet is applicable as a mask for liquid crystal and plasma displays and the like. With the high transparency, the polymer sheet is usable as material for medical supplies, such as a disposable injector, a medicine dropper, and a medicine container. With its high transparency, the polymer sheet can be used in replacement of glass for various bottles, glasses, household small-sized tanks to industrial-use large-sized tanks. Moreover, with the high transparency, the polymer sheet can be used as a material for contact lenses, lenses for glasses, and various optical lenses. Moreover, the polymer sheet can be used as glass for buildings or residences, with utilization of the high transparency. The polymer sheet, with the high rigidity, high toughness, and light weight, is applicable to material for extensive sporting goods, such as ski boots, skis, boards, rackets, various nets, tents, and rucksacks. Moreover, with the high rigidity, high toughness, and light weight, the polymer sheet can be used as material for handicraft articles such as a needle, scissors, and a sewing machine, and for decorative articles. The polymer sheet can be used as material for commercial articles, such as a show window and displaying articles. Moreover, the polymer sheet can be used as material for parts and facilities in parks, amusement parks, and theme parks; for example a swing, a seesaw, and a roller coaster. Other than the foregoing, the polymer sheet may be used as the following items, for example: structure material and box material for parts of precision apparatuses such as electric, electronic, and information apparatuses, and clocks; stationery goods such as files, folders, pencil boxes, writing materials, and scissors; cooking tools such as kitchen knives, bowls and the like; packaging material for food, sweets, tobacco, and the like; food containers, tableware, disposable chopsticks, toothpicks; furniture such as home furniture and office furniture; building material, interior material, and exterior material for buildings and residences; material for roads or bridges; material for toys; super strong fibers and thread; fishing equipment, fishing nets, and fishing tools for fishery; agricultural tools, agricultural articles; shopping bags and garbage bags; various pipes; garden supplies; and transportation containers, pallets, and boxes.

On the other hand, the polymer sheet made of PE can be used as super strong fibers.

Meanwhile, fluorine polymer sheets such as polyvinylidene fluoride, with its high ferroelectricity and piezoelectric properties, is applicable to materials for high-precision ultrasonic wave element fast switching elements, highly-efficient speakers, high sensitivity microphones and the like.

On the other hand, the polymer sheet of PET is applicable to industrial material which requires a high heat tolerance of approximately 200° C.

The present invention also includes a multilayered solid in which at least one layer is the polymer sheet according to the present invention. The multilayered solid according to the present invention may be any multilayered solid as long as at least one layer thereof is the polymer sheet of the present invention, and may also be one in which two or more layers are the polymer sheet according to the present invention. The multilayered solid according to the present invention may be entirely made of the polymer sheet of the present invention, or may be made partially of the polymer sheet of the present invention. The multilayered solid of the present invention is producible with a continuously formable apparatus 10 having the following specification for example: a continuously formable apparatus 10 illustrated in FIG. 1 configured in such a manner that two or more types of sheet-shaped supercooled melt each made of different polymers is extruded out from the supercooled melt feeder 2 to the sandwiching rollers 3 in a layered state. Apart from the continuously formable apparatus being different in specification as described above, the multilayered solid according to the present invention is produced similarly to the method of producing the monolayer polymer sheet. At this time, if all of the two or more types of the supercooled melt each made of different polymers is elongated by rolling at an elongation strain rate not less than the critical elongation strain rate and crystallized thereafter, a multilayered solid made entirely of the polymer sheet of the present invention is produced. Alternatively, if a portion of the supercooled melt made of the polymers is elongated by rolling at the elongation strain rate not less than the critical elongation strain rate, the multilayered solid made partially of the polymer sheet according to the present invention is produced.

The following description provides Examples, to further specifically explain the embodiment of the present invention. It should be noted that the present invention is not limited these Examples, and details thereof can take various aspects. The present invention is not limited to the description of the embodiment above, but may be altered by within the scope of the claims. An embodiment based on a proper combination of technical means disclosed in different embodiments is encompassed in the technical scope of the present invention.

Further, all the academic literatures and patent literatures cited in this specification are of assistance as references in this specification.

EXAMPLES

Example 1

Method of Producing Sample

Used as isotactic polypropylene (hereinafter, referred to as "iPP") in production of the polymer sheet were Adstif HA1152 ($M_w=34 \times 10^4$, $M_w/M_n=30$, equilibrium melting point $T_m^0=187°$ C.) manufactured by LyondellBasell Industries, and SunAllomer PM802A ($M_w=23 \times 10^4$, $M_w/M_n=7$, equilibrium melting point $T_m^0=187°$ C.) manufactured by SunAllomer Ltd. "$M_w$" denotes a weight average molecular weight and "$M_n$" denotes a number average molecular weight. $T_m^0$ in a certain $M_w$ was assumed as the same as $T_m^0$ of $M_w$ determined in "K. Yamada, M. Hikosaka et al., J. Mac. Sci. Prat B-Physics, B42 (3&4), 733 (2003)".

In the continuously formable apparatus 10 illustrated in FIG. 1, the iPP melt melted at 200° C. was made into a supercooled melt in a temperature range of 120° C. to 150° C., and was extruded out from a slit die of a supercooled melt feeder 2 so as to form a sheet shape. The sheet-shaped iPP supercooled melt was sandwiched between a pair of rotatable sandwiching rollers 3 kept at 140° C. to 150° C., and was elongated by rolling at an elongation strain rate not less than a critical elongation strain rate (in the present Example, referred to as "$\epsilon(L)$"), or an elongation strain rate smaller than the critical elongation strain rate (in the present Example, referred to as "$\epsilon(S)$"), to produce a sample. How the critical elongation strain rate $\epsilon^*$ is determined by observation with the optical microscope is described in Example 3 below.

The conditions of producing the produced sample are shown in Table 1.

TABLE 1

| Sample name | Product name | $T_{melt}/°$ C. | $T_R/°$ C. | $\epsilon/s^{-1}$ | $\epsilon^*/s^{-1}$ |
|---|---|---|---|---|---|
| iPP-A | HA1152 | 150 | 150 | $\epsilon(L) = 300$ | 50 |
| iPP-B | | | | $\epsilon(S) = 9$ | |
| iPP-C | PM802A | 120 | 140 | $\epsilon(L) = 300$ | 150 |

The samples used in the following Examples correspond to the sample names listed in Table 1. In Table 1, $T_{melt}$ is a temperature of the supercooled melt 1 immediately before the supercooled melt 1 is sandwiched between the rollers, which supercooled melt 1 is extruded out from the slit die of the supercooled melt feeder 2, and $T_R$ is a temperature of the pair of sandwiching rollers 3. Moreover, the critical elongation strain rate $\epsilon^*$ at a time in which a structure (form) changes completely at once, observed with the optical microscope and determined from the elongation strain rate $\epsilon$ as shown in the following examples, were as in the following equation:

$\epsilon^*=50\ s^{-1}$ (for iPP-A and iPP-B)

$\epsilon^*=150\ s^{-1}$ (for iPP-C)

Example 2

Method of Measuring Size (Particularly Thickness) of Sample and its Result

A sample produced in accordance with Example 1 was cut out as appropriate, to measure its physical properties, structure and the like. A size of the cutout sample in the length and width direction was measured with an optical substance microscope (SZX10-3141; manufactured by Olympus Corporation) using a scale calibrated with an object micrometer. The thickness of the sample was measured with a micrometer or the optical substance microscope (SZX10-3141; manufactured by Olympus Corporation). Measurement of size was carried out at a room temperature of 25° C. The thickness of the sample was 0.2 mm to 0.4 mm.

Example 3

Photomicrography of Sample

Microscopic observation was carried out by use of iPP-A (thickness of 0.25 mm) and iPP-B (thickness of 0.27 mm) as samples. Note that iPP-B was used as a comparative example. The samples were directly observed with a polarization micro system from a direction perpendicular to both directions of MD and TD (Through), and change in pattern and orientation of polymer chains were recorded and measured. The polarizing microscope used was BX51N-33P-OC manufactured by Olympus Corporation, the CCD camera used was the cooled digital camera QICAM manufactured by QImaging, and a personal computer was used for the recording. Further, in order to quantitatively measure retardation changes, a sensitive-tint plate was inserted between a polarizer and an analyzer (polarizing plate) of the polarizing microscope (see H. Awaya, *Kobunshi Sozai no Henko Kenbikyo Nyumon* (Introduction of Polarizing Microscope for Polymer Materials, Agne Gijutsu Center Co., Ltd. 2001, p. 75-103). Observation by the polarizing microscope was carried out at a room temperature of 25° C.

Figure 3:
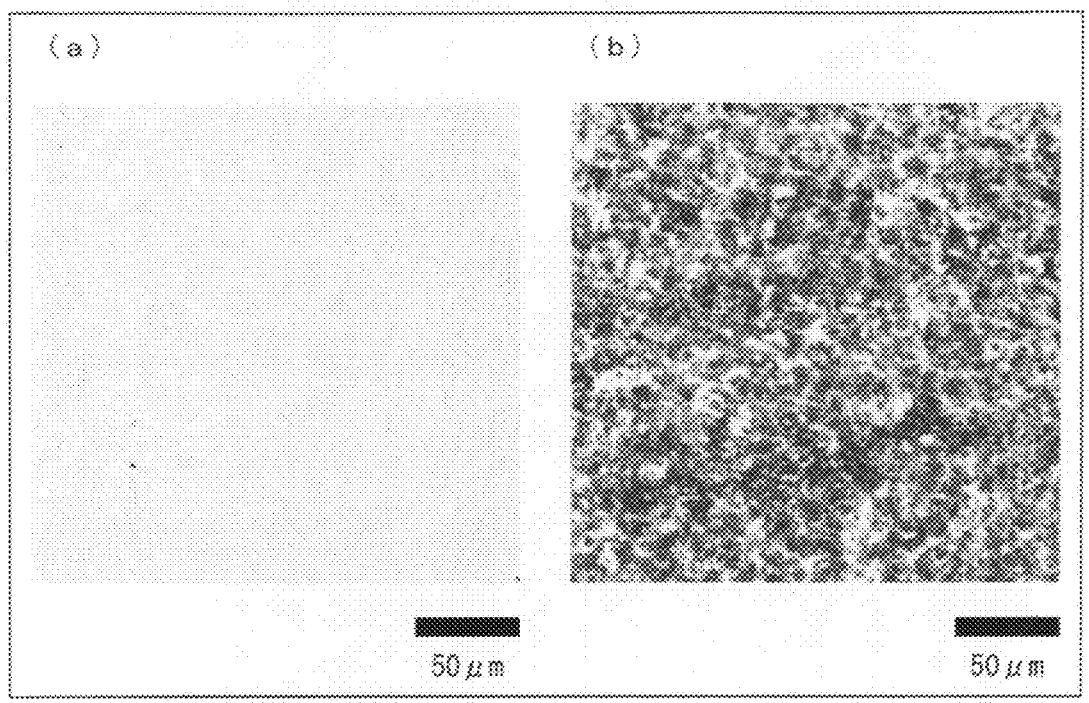
In FIG. 3, (a) is a polarization microscopic image of iPP-A (thickness of 0.25 mm) serving as an Example, and (b) is a polarization microscopic image of iPP-B (thickness of 0.27 mm), serving as a Comparative Example.

Polarization microscopic photographs are shown in FIG. 3. In iPP-A shown in FIG. 3(a), no granular spherocrystal was observed, but an extra-fine streaked pattern oriented in the MD direction was observed. The sample was rotated while the sensitive-tint plate was inserted in the polarizing microscope, which showed a color change in the MD direction (namely, retardation) from blue, purplish red, yellow, then purplish red, and further showed a clear extinction angle (purplish red color). Therefore, it was clearly recognized from this change in retardation that the polymer chains were remarkably oriented in the MD direction.

On the other hand, in the iPP-B shown in FIG. 3(b) serving as the comparative example, spherocrystals having a diameter of approximately 15 μm were observed, and was nonoriented. In a case where the iPP-B was formed with an increased elongation strain rate, the pattern observed with the optical microscope changed completely at once from the nonoriented state of granular spherocrystals to an oriented extra-fine streaked pattern, once the elongation strain rate exceeded 50 $s^{-1}$. Hence, it was easily possible to determine the critical elongation strain rate $\epsilon$ * based on the elongation strain rate in which its structure (pattern) changes completely at once, with use of the optical microscope.

Example 4

Method of Measuring Crystallinity of Sample and its Result

Crystallinity $X_c$ of each sample was measured by a density method. More specifically, the crystallinity of each of the samples was determined by a density method using mass (M) and volume (V). Measurement was carried out at a room temperature of 25° C. The size of the cutout sample was measured using a micrometer and an optical substance microscope (SZX10-3141; manufactured by Olympus Corporation). The mass of the cutout sample was measured with a digital electronic balance (ME253S; manufactured by Sartorius AG). Measurement was carried out at a room temperature of 25° C.

The cutout sample of iPP-A had a length of 3.2 mm, a width of 4.1 mm, and a thickness of 0.26 mm, and its mass was $3.18 \times 10^{-3}$ g. Hence, the sample had a density ρ of 0.93 (g/cm$^3$), and the crystallinity $X_c$ calculated by the foregoing formula of crystallinity (Math. 2) was 0.93 (=93%). The crystallinity was similarly calculated for iPP-B and iPP-C.

Example 5

Method of Heat Tolerance Test and its Result

A heat distortion temperature of iPP-A was measured by the test-piece size direct-reading method with use of an optical microscope. The test piece (having a length of 0.7 mm long, a width of 0.7 mm, and a thickness of 0.25 mm) was placed on a hot stage (L-600A; manufactured by Linkam Scientific Instruments Ltd.), and a temperature inside the hot stage was risen by a heating rate of 1 K per minute. Meanwhile, the test piece was observed and recorded with the optical microscope having a CCD camera (BX51N-33P-OC; manufactured by Olympus Corporation). The test piece was measured in the length direction (MD) and the width direction (TD) quantitatively with the image-analysis software (Image-Pro PLUS; manufactured by Media Cybernetics, Inc.), and a temperature at a time when the test piece started to contract (or expand) by not less than 3% in the MD direction or TD direction was acquired as the heat distortion temperature $T_d$.

Figure 4:
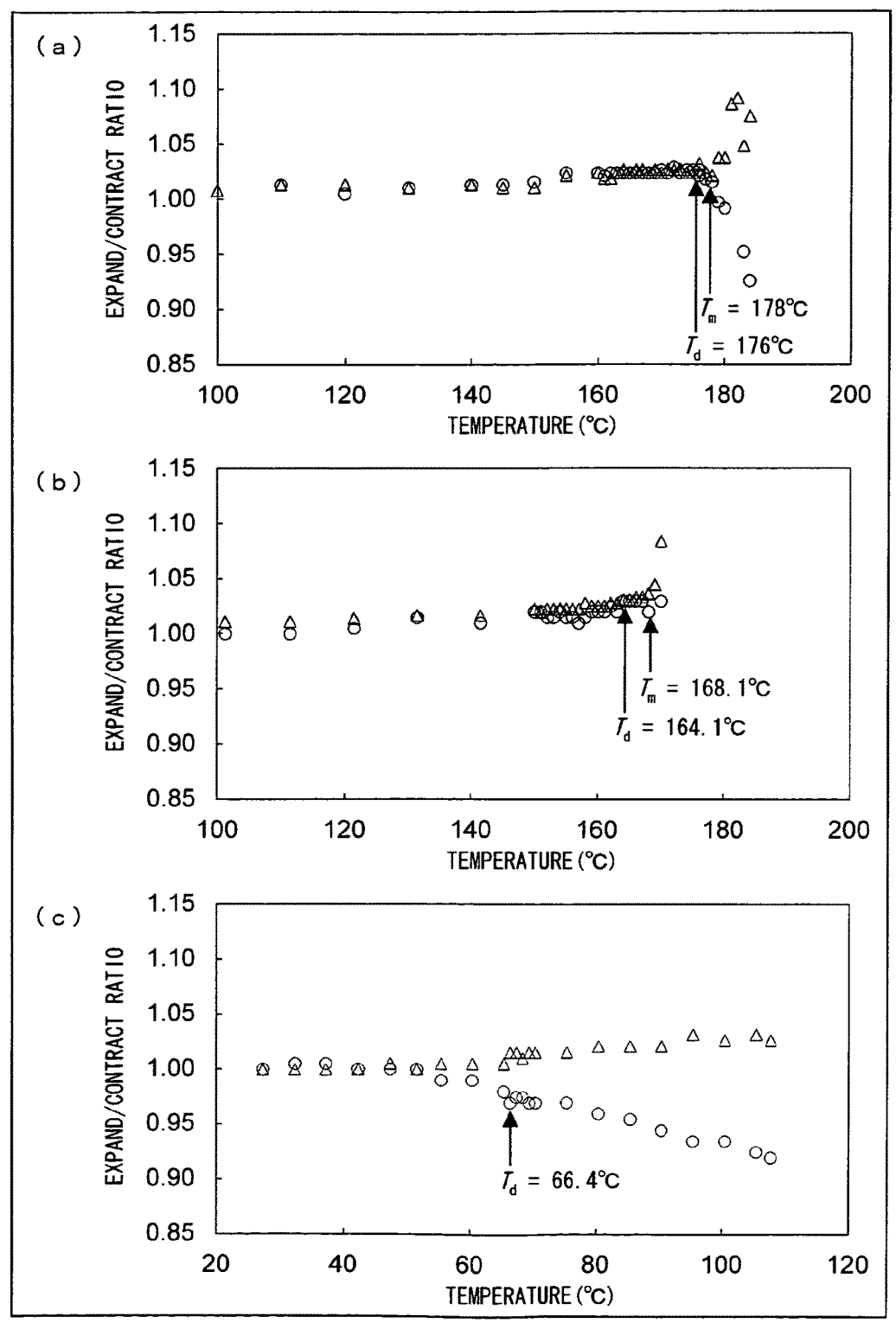
FIG. 4 shows results of measuring heat distortion temperatures of each sample: (a) is a result of iPP-A, (b) is a result of iPP-B, and (c) is a result of a uniaxial oriented film.

FIG. 4 shows a result of measuring the heat distortion temperatures. FIG. 4(a) shows the result of iPP-A, which resulted in having a heat distortion temperature $T_d$ of 176° C. and a melting point $T_m$ of 178° C.

FIG. 4(b) shows a result of iPP-B as Comparative Example 1. The test piece was sized to have a length of 0.7 mm, a width of 0.7 mm, and a thickness of 0.27 mm. The heat distortion temperature of iPP-B $T_d$ was 164.1° C., and the melting point $T_m$ was 168.1° C.

FIG. 4(c) shows a result of the heat distortion temperature of a uniaxial oriented film, as Comparative Example 2. The uniaxial oriented film was prepared by injection molding of PM600A manufactured by SunAllomer ($M_w = 30 \times 10^4$, $M_w/M_n = 7$, equilibrium melting point $T_m^0 = 187°$ C.) at 300 m/s, which was set to the precision universal tester (Autograph AG-1kNIS; manufactured by Shimadzu Corporation), and was pulled at a tensile rate of 10 mm/min at a room temperature of 25° C. A draw ratio X was 6.5. The test piece for measuring the heat distortion temperature had a length of 0.7 mm, a width of 0.7 mm, and a thickness of 0.22 mm. The heat distortion temperature $T_d$ of this uniaxial oriented film was 66.4° C.

In FIG. 4, the symbol "o" represents a size of the sample in the MD direction (Machine Direction), and the symbol "Δ" represents a size of the sample in the TD direction (Transverse Direction). Moreover, in FIG. 4, "$T_d$" denotes the heat distortion temperature of the sample and "$T_m$" denotes the melting point.

The heat distortion temperature was similarly measured for iPP-C.

Example 6

Method of Proving Oriented Nanocrystals and its Result

The sample of iPP-A was observed using a small-angle X-ray scattering method (hereinafter, referred to as "SAXS method"). The SAXS method was performed as described in "M. Kakudo and N. Kasai, *Kobunshi Ekkusu-sen Kaisetsu* (Polymer X-ray Diffraction), Maruzen Co., Ltd., 1968" or "T. Masuko, *Kobunshi Ekkusu-sen Kaisetsu* (Polymer X-ray Diffraction), 3.3 ed. Yamagata University Student Cooperative, 1995". More specifically, the SAXS method was carried out with SPring-8, Beam Line BL40B2 run by Japan Synchrotron Radiation Research Institute (JASRI) at a room temperature of 25° C., having an X-ray wavelength λ of 0.15 nm and a camera length of 1654 mm, and using Imaging Plate as a detector. The sample was observed from three directions: a direction perpendicular to both MD and TD (through), a direction parallel to TD (edge), and a direction parallel to MD (end). The MD direction was set as the Z-axis direction for the samples which were observed from through and edge and the TD direction was set as the Z-axis direction for the sample which was observed from end. The exposure time to X-rays was set as 180 seconds. The imaging plate was read by use of a reading apparatus and reading software manufactured by Rigaku Corporation (raxwish, control; Rigaku Corporation), thereby obtaining two-dimensional images thereof.

Figure 5:
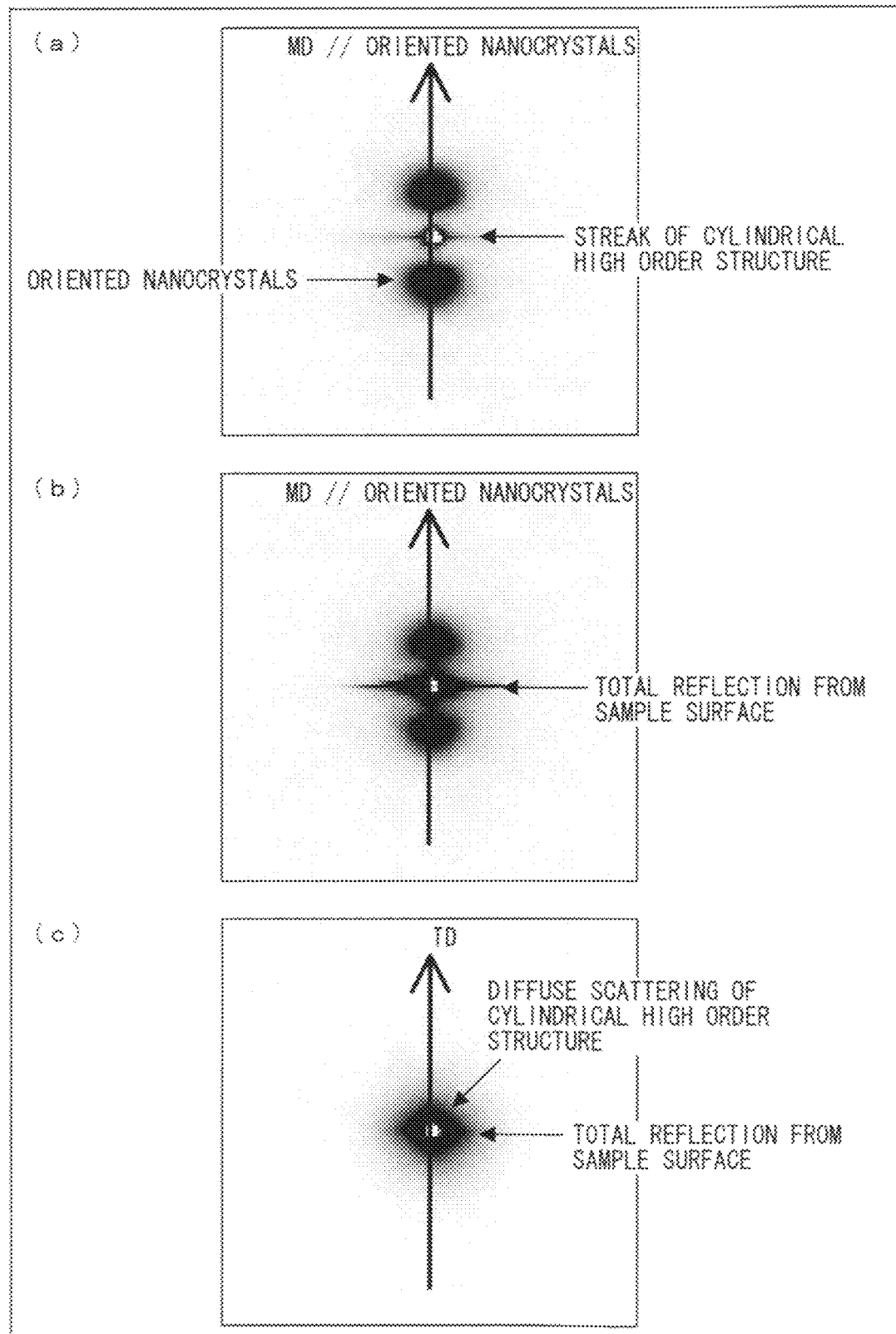
FIG. 5 illustrates a two-dimensional scatter pattern which is obtained by observing a sample of iPP-A in a small-angle X-ray scattering method, which iPP-A serves as an Example; (a) illustrates a result of having the sample be exposed to X-rays from a direction perpendicular to MD and TD (through), (b) illustrates a result of having the sample be exposed to X-rays from a direction parallel to TD (edge), and (c) illustrates a result of having the sample be exposed to X-rays from a direction parallel to MD (end).

FIG. 5 illustrates the two-dimensional images. Illustrated in (a) through and (b) edge are each a two-pointed image in the MD direction, and thus was found that the oriented nanocrystals are oriented extremely strongly in the MD direction. Moreover, (a) through showed a streak extending in an equatorial direction from a center thereof, and (c) end showed a nonoriented diffuse scattering dispersion which spreads isotropically from its center. From this fact, it was possible to come to the conclusion that a polymer sheet produced at a supercritical elongation strain rate $\epsilon(L)$ has a cylindrical high order structure (see A. Guinier, "*Ekkusu-sen Kessyogaku no Riron to Jissai*" (Theory and Practice of X-ray Crystallography), Rigaku Corporation, p. 513, 1967). A diameter φ of the cylindrical high order structure was analyzed and determined in Example 8 later described. A similar analysis was carried out for iPP-C, whereby attaining a same result as iPP-A.

Figure 6:
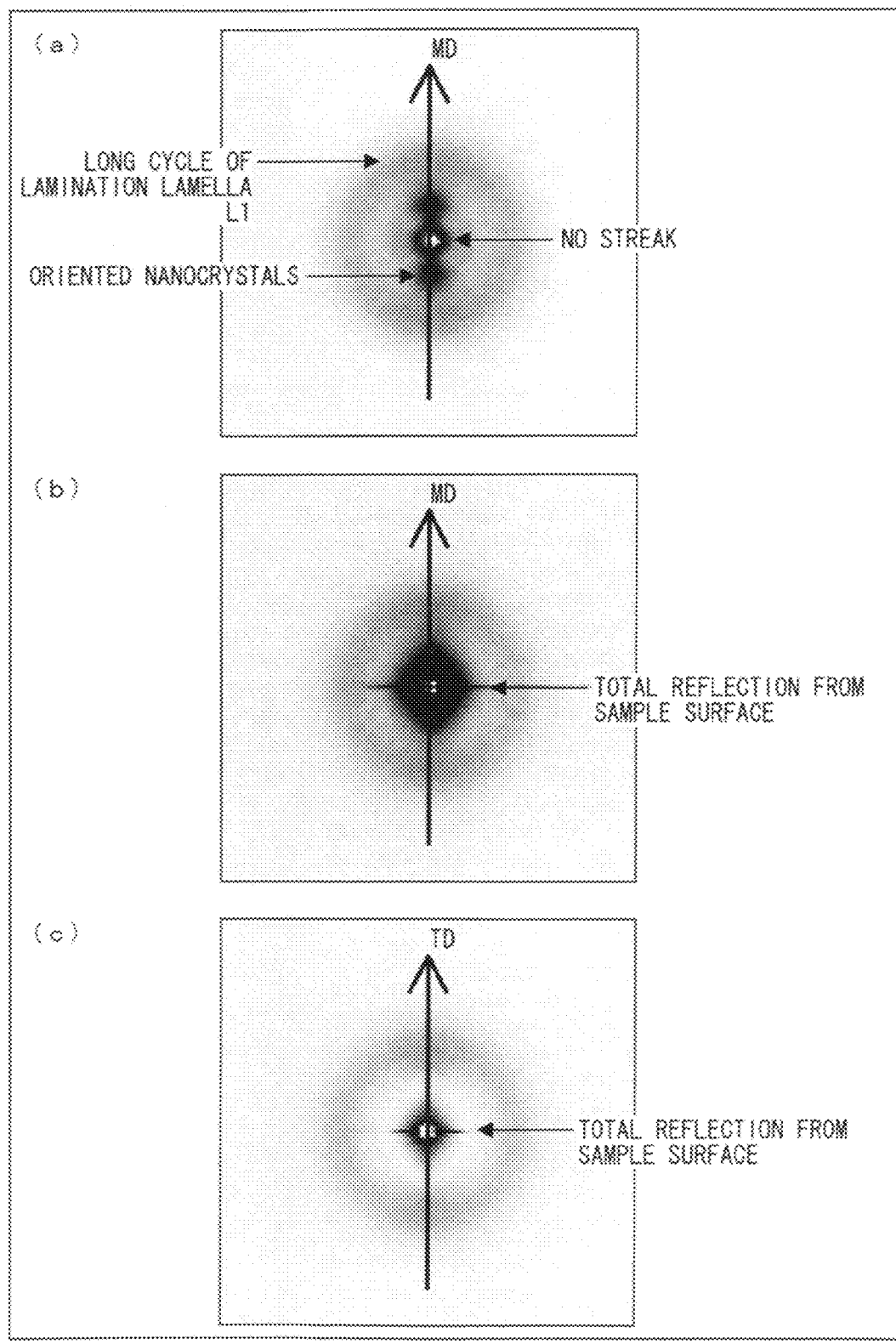
FIG. 6 illustrates a two-dimensional scatter pattern which is obtained by observing a sample of iPP-B in a small-angle X-ray scattering method, which iPP-B serves as a Comparative Example; (a) illustrates a result of having the sample be exposed to X-rays from a direction perpendicular to MD and TD (through), (b) illustrates a result of having the sample be exposed to X-rays from the direction parallel to TD (edge), and (c) illustrates a result of having the sample be exposed to X-rays from a direction parallel to MD (end).

As a comparative example, iPP-B was similarly observed from the three directions of through, edge, and end. FIG. 6 illustrates its result obtaining two-dimensional images thereof. Although oriented nanocrystals oriented in the MD direction were slightly observed in (a) through, a long cycle pattern of a nonoriented lamination lamella similar to stationary crystallization were observed in all of the (a) through, (b) edge, and (c) end.

Example 7

Method of Measuring Size d of Oriented Nanocrystals and its Result

Figure 7:
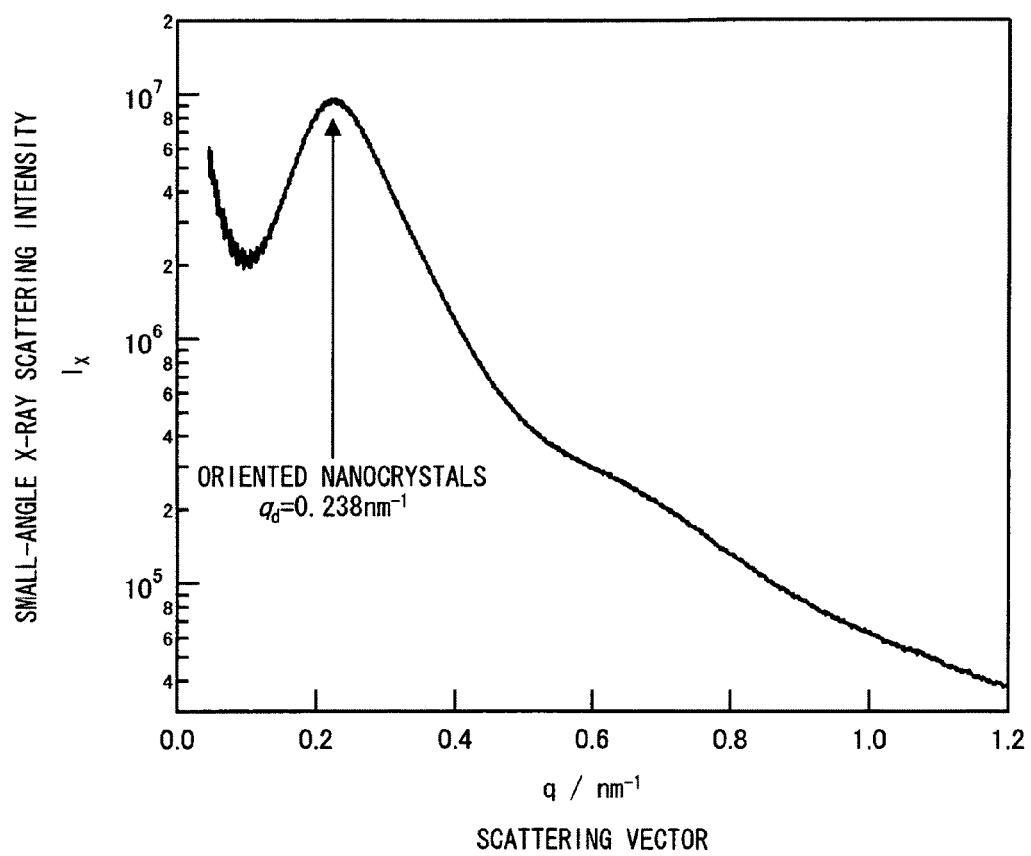
FIG. 7 illustrates a curve of a small-angle X-ray scattering intensity ($I_x$) against a scattering vector (q) drawn based on a two-dimensional scatter pattern obtained by having a sample of iPP-A be exposed to X-rays from a direction perpendicular to MD and TD (through), which iPP-A serves as an Example.

The two-dimensional image of through of iPP-A obtained in Example 6 was analyzed using analysis software (R-axis, display; Rigaku Corporation). A curve of a small-angle X-ray scattering intensity $(I_x)$ against a scattering vector (q) shown in FIG. 7 was obtained by integrating angles of deviation all around the two-dimensional image and thereafter carrying out background correction. A scattering vector q corresponding to a primary peak in the $I_x$ curve is $q_d$, which showed a value of 0.238 nm$^{-1}$. Accordingly, the size d of the oriented nanocrystals was $2\pi/q_d$=26 nm.

Figure 8:
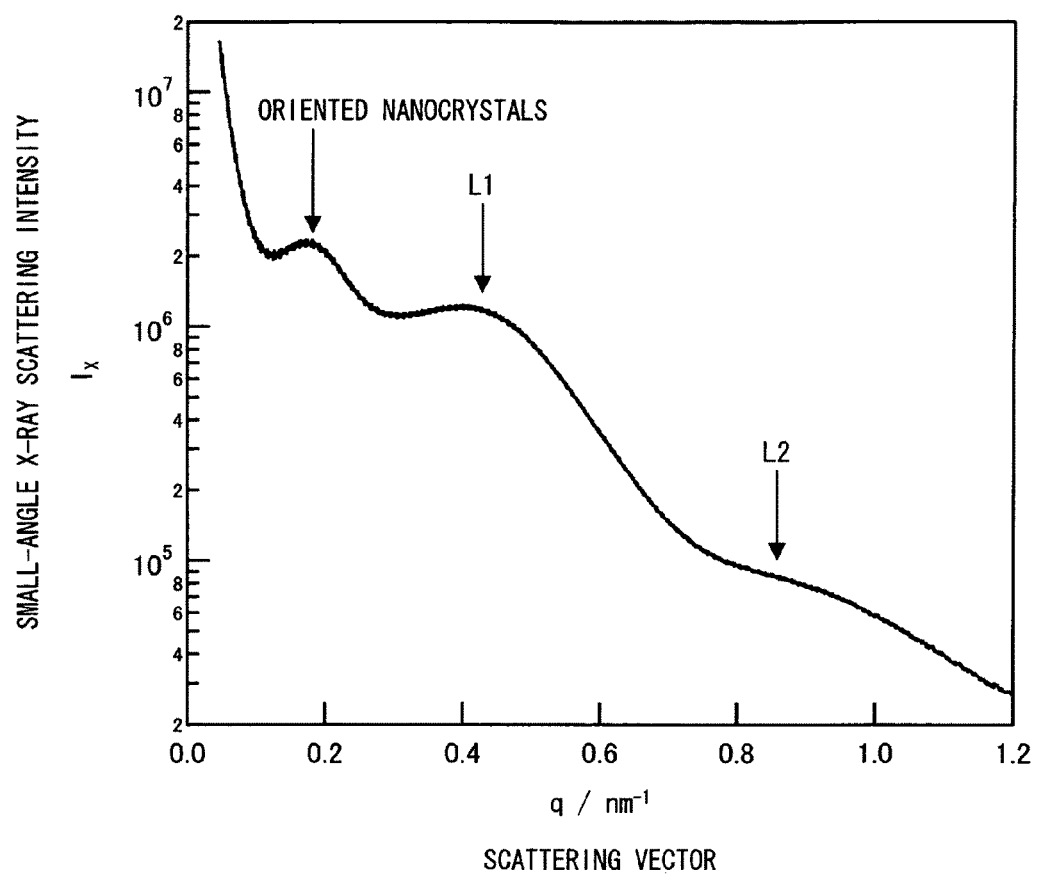
FIG. 8 illustrates a curve of a small-angle X-ray scattering intensity ($I_x$) against a scattering vector (q) drawn based on a two-dimensional scatter pattern obtained by having a sample of iPP-B be exposed to X-rays from a direction perpendicular to MD and TD (through), which iPP-B serves as a Comparative Example.

As a comparative example, FIG. 8 shows a curve of a small-angle X-ray scattering intensity $(I_x)$ against a scattering vector (q) obtained for the through of iPP-B described in Example 6. Although the peak of the oriented nanocrystals is observed slightly, the long cycle structure (L1, L2) of the lamination lamella had appeared. Hence, it was found that the sample prepared in the conditions of $\epsilon(S)$ was made mostly of lamination lamella crystals.

Size d of the oriented nanocrystals was determined similarly for iPP-C.

Example 8

Figure 9:
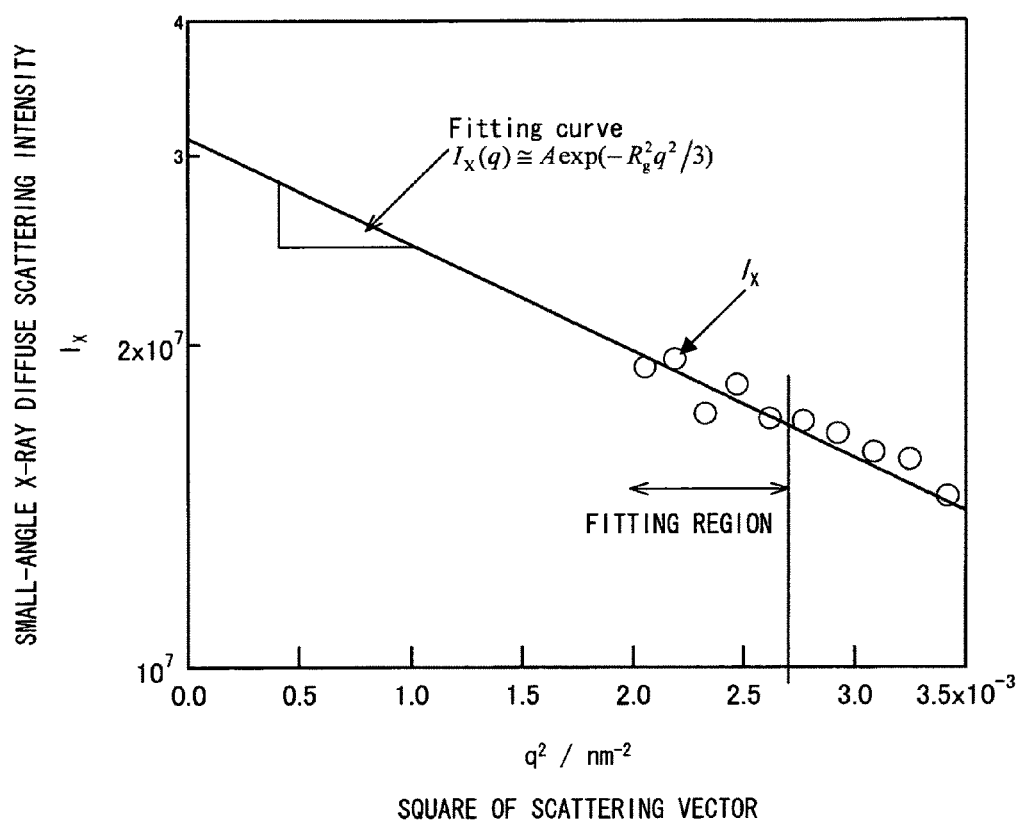
FIG. 9 illustrates a curve of a small-angle X-ray scattering intensity ($I_x$) against a scattering vector (q) drawn based on a two-dimensional scatter pattern obtained by having a sample of iPP-A be exposed to X-rays from a direction parallel to MD (end), which iPP-A serves as an Example.

Method of Measuring Diameter φ of Cylindrical High Order Structure and its Result The two-dimensional image of the end of iPP-A obtained in Example 6 was analyzed with analysis software (R-axis, display; Rigaku Corporation). As a result of integrating all angles of deviation in the two-dimensional image excluding total reflection from the sample surface and thereafter carrying out background correction, a curve of a small-angle X-ray diffuse scattering intensity $(I_x)$ against a square of a scattering vector $(q^2)$ shown in FIG. 9 was obtained. An approximated curve was obtained by the formula of a Guinier plot $I_x$=Aexp$(-R_g^2 q^2/3)$, and an inertia radius $R_g$=26 nm was obtained from a slope of the curve. As a result, a diameter φ of the cylindrical high order structure was determined as follows: $2\times\sqrt{(5\div3)}\times R_g$=70 nm.

The diameter φ of the cylindrical high order structure was similarly determined for iPP-C.

Example 9

Method of Measuring $\alpha_2$ Fraction of Sample and its Result

The sample of iPP-A was observed by the wide-angle X-ray scattering method (WAXS method) from the three directions of through, edge, and end. The WAXS method was carried out with SPring-8, Beam Line BL40B2 of Japan Synchrotron Radiation Research Institute (JASRI) at a room temperature of 25° C., using an Imaging Plate as a detector, and having a wavelength of the X-ray (λ) be set as 0.072 nm and a camera length (R) be set as 270 mm. The MD direction was set as the Z-axis direction for the samples which were observed from the through and edge, and the TD direction was set as the Z-axis direction for the sample which was observed from the end. The exposure time to X-rays was set as 60 seconds. The imaging plate was read out by a reading apparatus and reading software (raxwish, control; Rigaku Corporation) manufactured by Rigaku Corporation, thus obtaining two-dimensional images thereof. Further, the two-dimensional image was analyzed using analysis software (R-axis, display; Rigaku Corporation), to measure a volume fraction f of $\alpha_2$ phase $(\alpha_2)$. More specifically, an $\alpha_2$ fraction was calculated by the following formula:

(Formula)

$$f(\alpha_2) = \frac{|F_0|}{|F_{\alpha_2}|}$$ Math. 13 for hkl=−2, 3, 1 and −1, 6, 1 (see M. Hikosaka, Polymer Journal, 1973, 5, p. 124).

Here, $|F_0|$ is a structure factor obtained from observation of hkl=−2, 3, 1, and −1, 6, 1, $|F_{\alpha_2}|$ is a structure factor of hkl=−2, 3, 1, and −1, 6, 1 at a time when it is 100% $\alpha_2$ phase. The $|F_0|$ satisfies a relationship with the wide-angle X-ray scattering intensity $(I_x)$ obtained upon correcting the background, as in the following formula:

(Formula) $I_x = |F_0|^2$

Figure 10:
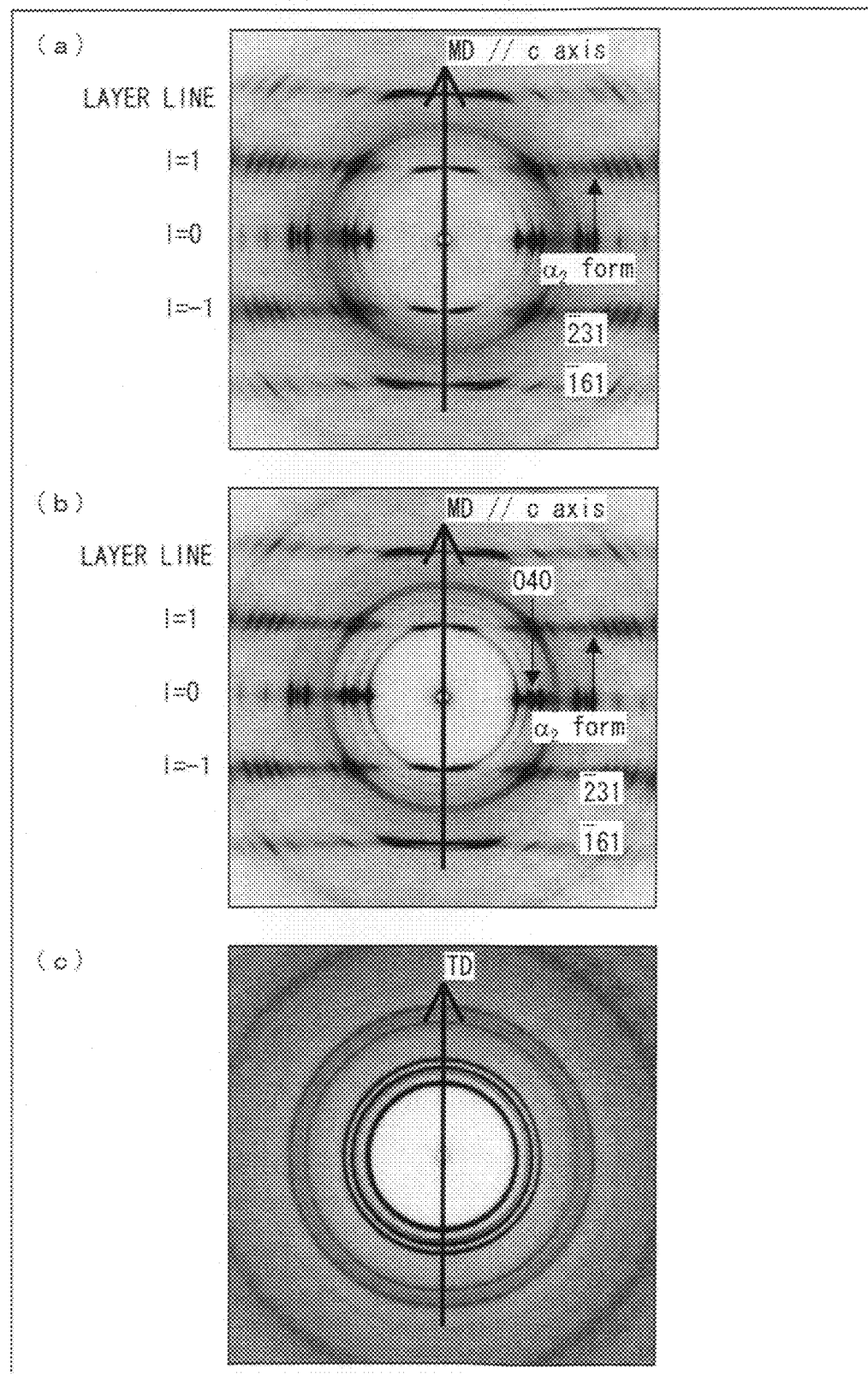
FIG. 10 illustrates two-dimensional scatter patterns which are obtained by observing a sample of iPP-A in a wide-angle X-ray scattering method, which iPP-A serves as an Example; (a) illustrates a result of having the sample be exposed to X-rays from a direction perpendicular to MD and TD (through), (b) illustrates a result of having the sample be exposed to X-rays from the direction parallel to TD (edge), and (c) illustrates a result of having the sample be exposed to X-rays from a direction parallel to MD (end).

FIG. 10 illustrates a result of the two-dimensional images. The two-dimensional images of (a) through and (b) edge clearly shows that the crystal structure is of the $\alpha_2$ phase, since hkl=−2, 3, 1, and −1, 6, 1 reflection appeared. (See M. Hikosaka, Polymer Journal, 1973, 5, p. 111-127). The $\alpha_2$ fraction $f(\alpha_2)$ was 0.8.

Figure 11:
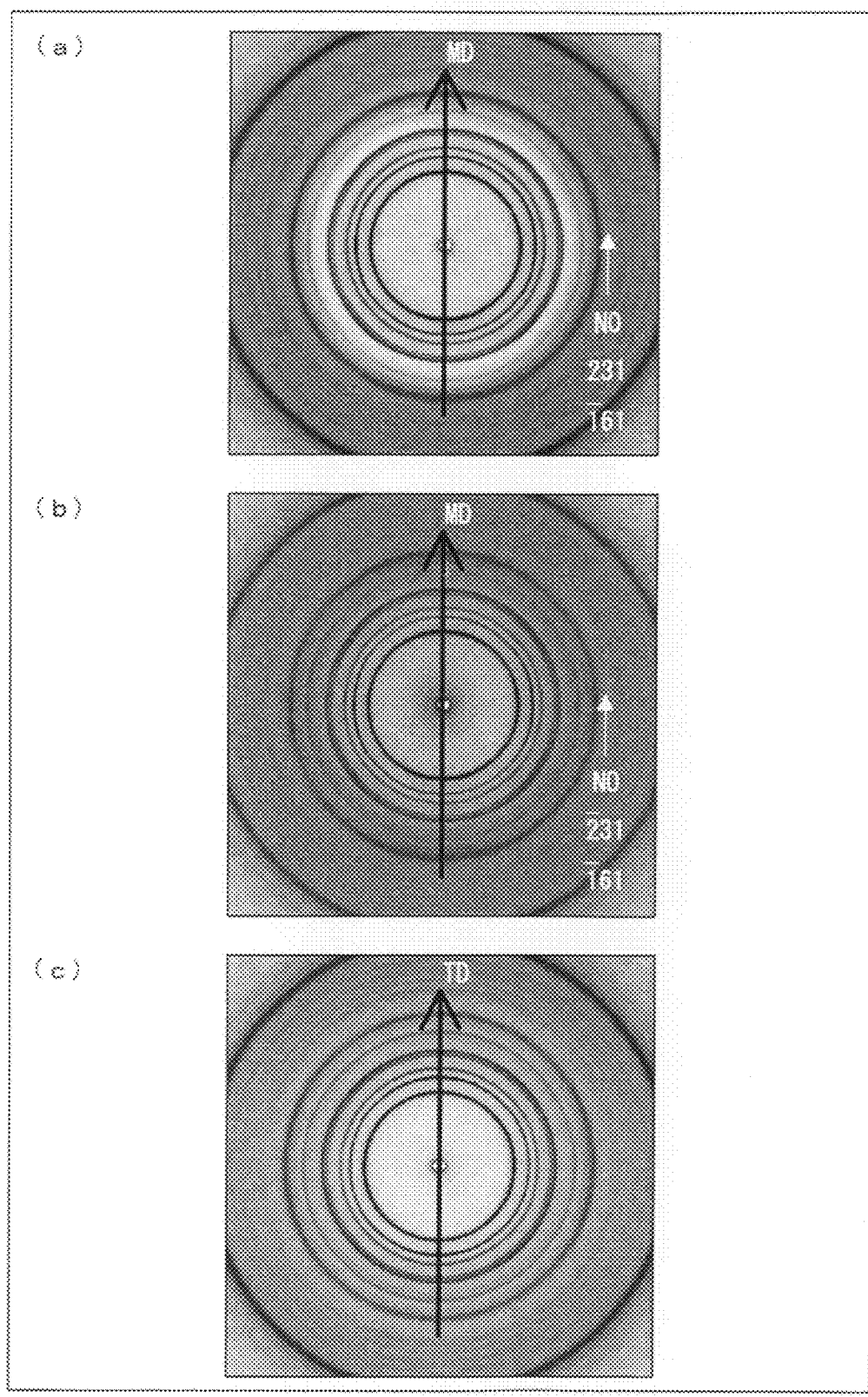
FIG. 11 illustrates a two-dimensional scatter pattern which is obtained by observing a sample of iPP-B in a wide-angle X-ray scattering method, which iPP-B serves as a Comparative Example; (a) illustrates a result of having the sample be exposed to X-rays from a direction perpendicular to MD and TD (through), (b) illustrates a result of having the sample be exposed to X-rays from the direction parallel to TD (edge), and (c) illustrates a result of having the sample be exposed to X-rays from a direction parallel to MD (end).

As a comparative example, the sample of iPP-B was similarly observed from the three directions of through, edge, and end. FIG. 11 shows the result of the two-dimensional images thereof. No hkl=−2, 3, 1, and −1, 6, 1 reflection were observed in the two-dimensional images of (a) through and (b) edge, so therefore it was clearly shown that the crystal structure thereof is an $\alpha_1$ phase (see M. Hikosaka, Polymer Journal, 1973, 5, p. 111-127).

The $\alpha_2$ fraction was similarly determined with iPP-C.

Example 10

Proof of Oriented Crystalline, Method of Measuring Orientation Function $f_c$ and its Result An orientation function $f_c$ was obtained in the two-dimensional image of iPP-A, $\epsilon(L)=3\times10^2 s^{-1}$ which was obtained in Example 9. More specifically, orientation function $f_c$ was obtained by analyzing the obtained two-dimensional image illustrated in FIG. 10(b) of edge by the imaging plate reading software (raxwish, control; Rigaku International Corporation), by analyzing with a spreadsheet software (Igor Pro; manufactured by WaveMetrics). As to hkl=040 reflection shown in FIG. 10(b), the curve of wide angle X-ray scattering intensity ($I_x$) against to angle of deviation ($\beta$) was obtained by carrying out background correction. More specifically, a formula of the orientation function is as follows:

$$f_c = \langle 3\cos^2\beta - 1 \rangle \div 2.$$

However, $f_c$ is calculated by use of the following formula:

(Formula)

$$\langle 3\cos^2\beta - 1 \rangle = \frac{\int_0^{2\pi}(3\cos^2\beta - 1)I_X(\beta)d\beta}{\int_0^{2\pi}I_X(\beta)d\beta} \quad \text{Math. 14}$$

It was revealed that the molecule chain (c axis) is oriented extremely strongly in the MD direction in the (a) through and (b) edge of FIG. 10. Since (c) end corresponded to the equatorial plane of l=0 of through, this was nonoriented. The oriented function of $f_c$=0.92 was obtained in accordance with the hkl=040 reflection of (b) edge.

A result of the two-dimensional image of the comparative example iPP-B obtained in Example 9 is shown in FIG. 11. Although the molecular chain (c axis) was slightly oriented in the MD direction in the samples of (a) through and (b) edge, the samples were mostly nonoriented. Moreover, the (c) end was nonoriented.

The orientation function $f_c$ was similarly determined for iPP-C.

Example 11

Method of Mechanical Property Test and its Result

Tensile strength of the sample of iPP-A was measured in conformity with JIS K7127. More specifically, a test piece (gauge length of 7 mm, width of narrow parallel part of 1.6 mm, and thickness of 0.25 mm) was set in the precision universal tester (Autograph AG-1kNIS; manufactured by Shimadzu Corporation), to measure tensile strength by pulling the test piece at a tensile rate of 10 mm/min. Measurement was carried out at a room temperature of 25° C.

Figure 12:
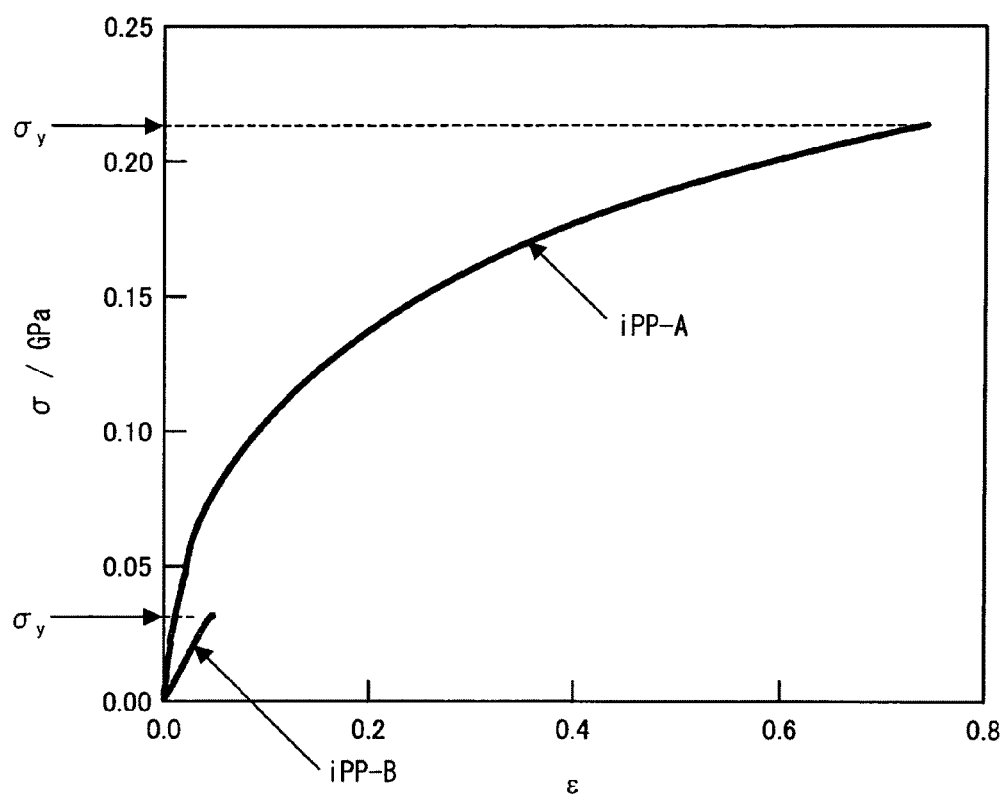
FIG. 12 is a view showing a result of measuring tensile strength and tensile modulus, of a sample of iPP-A serving as an Example and of a sample of iPP-B serving as a Comparative Example.

FIG. 12 shows a result of measuring the tensile strength and the tensile modulus of iPP-A. The tensile strength was $\sigma_y$=0.21 GPa and the tensile modulus was E=4.1 GPa.

Together in FIG. 12, a result of measuring the tensile strength of the sample of iPP-B is shown, as a comparative example. The test piece had a size of a gauge length of 10 mm, a width of the narrow parallel part of 2.8 mm, and a thickness of 0.3 mm. The tensile strength was $\sigma_y$=0.032 GPa and the tensile modulus was E=1.4 GPa.

The tensile strength and tensile modulus were similarly measured with iPP-C.

Example 12

Method of Haze Test and its Result

The haze (haze: thickness of 0.3 mm) of iPP-A was measured by a haze measuring method. The haze measuring method was carried out by measuring the amount of light transmitted through the test piece. An apparatus including an optical microscope (BX51N-33P-OC; manufactured by Olympus Corporation), a CCD camera (cooled digital camera QICAM; manufactured by QImaging) capable of determining the amount of light, and image analysis software (Image-Pro PLUS; manufactured by Media Cybernetics, Inc.) were used in the haze measuring method. A halogen lamp was used as a white light source, to use as measuring light. The size of incident light of this measuring light was of a round shape having a diameter of 1 mm. Calibration of the value of haze in the haze measurement was carried by use of a sheet of a comparative example whose haze was measured in conformity to JIS K7136. Measurement was carried out at a room temperature of 25° C.; the measured result was converted into a measurement corresponding to a sample thickness of 0.3 mm, to determine the haze. The iPP-C was also similarly measured in haze.

Figure 13:
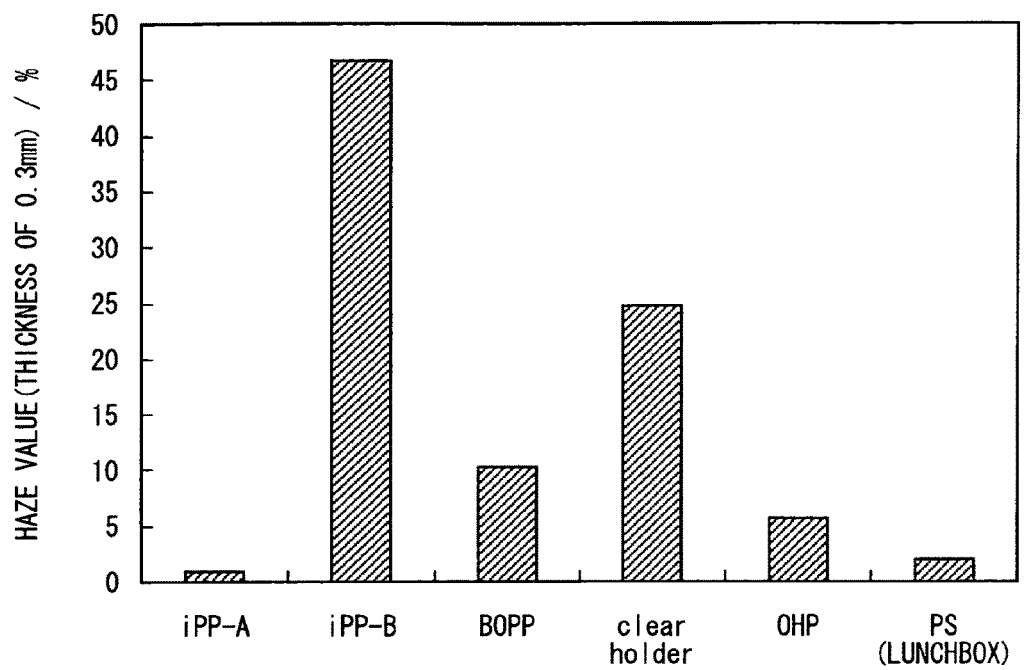
FIG. 13 is a view showing a result of measuring a haze value (thickness of 0.3 mm) for each of (i) a sample of iPP-A serving as an Example, (ii) a sample of iPP-B serving as a Comparative Example, and (iii) another sample (Comparative Example).

FIG. 13 illustrates a result of the haze measured for the samples of iPP-A and the comparative example (iPP-B). The haze (haze value, thickness of 0.3 mm) of iPP-B was 0.9%. Haze values of other comparative examples (BOPP (commercial item), clear holder (commercial item), OHP (commercial item), and transparent lid of a disposable lunch box made from PS (commercial item)) obtained as a result of converting the haze value with respect to the thickness of 0.3 mm are shown in one line in FIG. 13. In FIG. 13, the transparent lid of the disposable lunch box made of PS is expressed as "PS (lunch box)".

Moreover, Table 2 shows haze values (thickness of 0.3 mm) of iPP-A, iPP-C, iPP-B, BOPP, Clear holder, OHP, and the transparent lid of the disposable lunch box made of PS (expressed as "PS (lunch box)" in Table 2).

TABLE 2

| | | | Haze value (thickness of 0.3 mm) % |
|---|---|---|---|
| Examples | $\epsilon(L) > \epsilon^*$ | iPP-A | 0.9 |
| | | iPP-B | 2 |
| Comparative Examples | $\epsilon(S) < \epsilon^*$ | iPP-C | 46.75 |
| | BOPP | | 10.17 |
| | clear holder | | 24.64 |
| | OHP | | 5.59 |
| | PS (lunchbox) | | 1.94 |

CONCLUSION OF EXAMPLES

The results of Examples 1 to 12 are summarized in Table 3.

TABLE 3

| | Examples $\epsilon(L) > \epsilon^*$ | | Comparative Example $\epsilon(S) < \epsilon^*$ |
|---|---|---|---|
| | iPP-A | iPP-C | iPP-B |
| Crystallinity $X_c$ | 0.93 | 0.92 | 0.5 |
| Heat distortion temperature $T_d$/° C. | 176 | 168 | 164.1 |

TABLE 3-continued

|  | Examples $\epsilon(L) > \epsilon^*$ | | Comparative Example $\epsilon(S) < \epsilon^*$ |
|---|---|---|---|
|  | iPP-A | iPP-C | iPP-B |
| Size of Oriented nanocrystals d/nm | 26 | 25 | — |
| Diameter of cylindrical high order structure φ/nm | 70 | 80 | — |
| α₂ fraction f(α₂) | 0.8 | 0.8 | 0 |
| Orientation function $f_c$ | 0.92 | 0.91 | 0.35 |
| Mechanical properties — Tensile strength at break $\sigma_y$/GPa | 0.21 | 0.19 | 0.032 |
| Tensile modulus E/GPa | 4.1 | 3.8 | 1.4 |
| Haze value (thickness of 0.3 mm)/% | 0.9 | 2 | 46.75 |

INDUSTRIAL APPLICABILITY

As described above, the present invention makes it possible to produce a polymer sheet. This makes it possible to use general-purpose plastics as alternatives to engineering plastics and thereby achieve large reductions in cost of various industrial products made of polymers. Further, the present invention can make polymers equivalent in strength to metals, thus making it possible to use the polymer sheet as an alternative to metal.

Therefore, the present invention can be used not only in various industries which handle parts made of polymers but also industries which handle parts made of metal.

REFERENCE SIGNS LIST

10 Continuously formable apparatus
20 Batch forming apparatus
1 Supercooled melt
2 Supercooled melt feeder
3 Sandwiching roller
4a, 4b Hot bath
5 Plate-shaped polymer melt

The invention claimed is:

1. A polymer sheet, comprising:
nanocrystals of a polymer in a proportion of not less than 80% of the polymer sheet,
the polymer sheet satisfying the following conditions (I), (II), (III), and (IV),
(I) having a crystallinity of not less than 92%;
(II) having a tensile strength at break of not less than 100 MPa and a tensile modulus of not less than 3 GPa;
(III) having an average thickness of not less than 0.15 mm, and
(IV) comprising a cylindrical high order structure,
the polymer sheet being produced by (i) sandwiching polymer melt of a supercooled state between a pair of sandwiching rollers, (ii) elongating the polymer melt by rolling at an elongation strain rate not slower than a critical elongation strain rate, and (iii) crystallizing the polymer melt, and
the polymer sheet being produced by setting a radius R of the sandwiching rollers, an average thickness L of the polymer sheet which has been subjected to the elongation by rolling, and a sheet take-off speed V at the sandwiching rollers by use of the following approximation formula (Formula i), so that an average elongation strain rate ε(R, L, V) in a sheet thickness direction is not less than a critical elongation strain rate ε*(R, L, V), (Formula i)

$$\varepsilon(R, L, V) = \frac{V}{\sqrt{RL}} \qquad \text{Math. 1}$$

where R is the radius of the sandwiching rollers, L is the average thickness of the polymer sheet which has been subjected to the elongation by rolling, V is the sheet take-off speed at the sandwiching rollers, and ε(R, L, V) is the average elongation strain rate in the sheet thickness direction.

2. The polymer sheet according to claim 1, wherein the polymer is polyolefin.

3. The polymer sheet according to claim 1, wherein the polymer is polypropylene.

4. The polymer sheet according to claim 3, wherein a heat distortion temperature measured in accordance with a test-piece size direct-reading method is not less than 160° C.

5. The polymer sheet according to claim 1, wherein a haze value of a test piece of the polymer sheet is not more than 10%, the test piece having a thickness of 0.3 mm measured in accordance with a haze measuring method.

6. The polymer sheet according to claim 3, wherein the cylindrical high order structure is a cylindrical high order structure having a diameter of not more than 300 nm, the cylindrical high order structure being made up of oriented nanocrystals arranged in a parallel manner.

7. The polymer sheet according to claim 3, comprising, in its crystal structure, oriented nanocrystals having a α2 fraction of not less than 0.3, the α2 fraction being indicative of a volume fraction of a α2 phase which is a high order degree phase.

8. The polymer sheet according to claim 3, comprising oriented nanocrystals having an orientation function fc of not less than 0.7, the orientation function fc being indicative of a degree of orientation of a polymer chain inside a crystal.

9. The polymer sheet according to claim 1, wherein the critical elongation strain rate ε*(R, L, V) is calculated by the following approximate formula (Formula ii):

(Formula II)

(Formula ii)

$$\varepsilon^*(R, L, V) = \frac{V^*}{\sqrt{RL}} \qquad \text{Math. 2}$$

where V* is a sheet take-off speed at a critical point, the sheet take-off speed V* at the critical point being a sheet take-off speed V at a critical point at a time when a structure changes completely at once upon crystallization into a polymer sheet having the thickness L and being made up of oriented nanocrystals, by feeding polymer melt of a supercooled state, sandwiching the polymer melt between the pair of sandwiching rollers each having the radius R, and elongating the polymer melt by rolling at the sheet take-off speed V.

10. The polymer sheet according to claim 1, wherein the critical elongation strain rate $\epsilon^*(R, L, V)$ is calculated by the following approximate formula (Formula iii):

(Formula iii)
$$\varepsilon^*(R, L, V) = \frac{V}{\sqrt{RL^*}}.$$
Math. 3 where $L^*$ is a thickness of the polymer sheet at a critical point, the thickness $L^*$ of the polymer sheet at a critical point being a thickness L of the polymer sheet at a critical point at a time when a structure changes completely at once upon crystallization into a polymer sheet having the thickness L and being made up of oriented nanocrystals, by feeding polymer melt of a supercooled state, sandwiching the polymer melt between the pair of sandwiching rollers each having the radius R, and elongating the polymer melt by rolling at the sheet take-off speed V.

11. A multilayered solid comprising at least one layer of a polymer sheet as set forth in claim 1.

* * * * *